(12) United States Patent
Um et al.

(10) Patent No.: US 7,019,806 B2
(45) Date of Patent: Mar. 28, 2006

(54) LIQUID CRYSTAL DISPLAY AND THIN FILM TRANSISTOR ARRAY PANEL

(75) Inventors: Yoon-Sung Um, Yongin (KR); Nak-cho Choi, Seoul (KR); Jae-Jin Lyu, Kyungki-do (KR); Jeong-Ho Lee, Seoul (KR); Young-Joon Rhee, Seoul (KR); Myung-Jae Park, Suwon (KR); Jang-Kun Song, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 10/830,785

(22) Filed: Apr. 23, 2004

(65) Prior Publication Data

US 2004/0196427 A1    Oct. 7, 2004

Related U.S. Application Data

(62) Division of application No. 10/302,784, filed on Nov. 22, 2002.

(30) Foreign Application Priority Data

| Nov. 22, 2001 | (KR) | 2001-0072885 |
| Aug. 11, 2002 | (KR) | 2002-0069112 |
| Nov. 9, 2002 | (KR) | 2002-0054923 |
| Nov. 20, 2002 | (KR) | 2002-0072150 |

(51) Int. Cl.
*G02F 1/1337* (2006.01)

(52) U.S. Cl. .................................................. 349/129
(58) Field of Classification Search ................ 349/113, 349/129, 130
See application file for complete search history.

(56) References Cited

U.S. PATENT DOCUMENTS 6,424,396 B1 * 7/2002 Kim et al. .................. 349/130
6,717,632 B1 * 4/2004 Ha et al. ...................... 349/43

* cited by examiner

*Primary Examiner*—James A. Dudek
(74) *Attorney, Agent, or Firm*—F. Chau & Associates, LLC

(57) ABSTRACT

A liquid crystal display is provided, which includes a gate line formed on a first insulating substrate, a data line intersecting the gate line and insulated from the gate line, a pixel electrode provided in a pixel area defined by the intersection of the gate line and the data line, a second insulating substrate facing the first insulating substrate, a common electrode formed on the second insulating substrate, a liquid crystal layer interposed between the pixel electrode and the common electrode, a first cutout in the pixel electrode, and a second cutout provided in the common electrode and partitioning the pixel area into a plurality of domains along with the first cutout. The plurality of domains in the pixel area are classified into at least two types based on thickness of the liquid crystal layer.

9 Claims, 35 Drawing Sheets

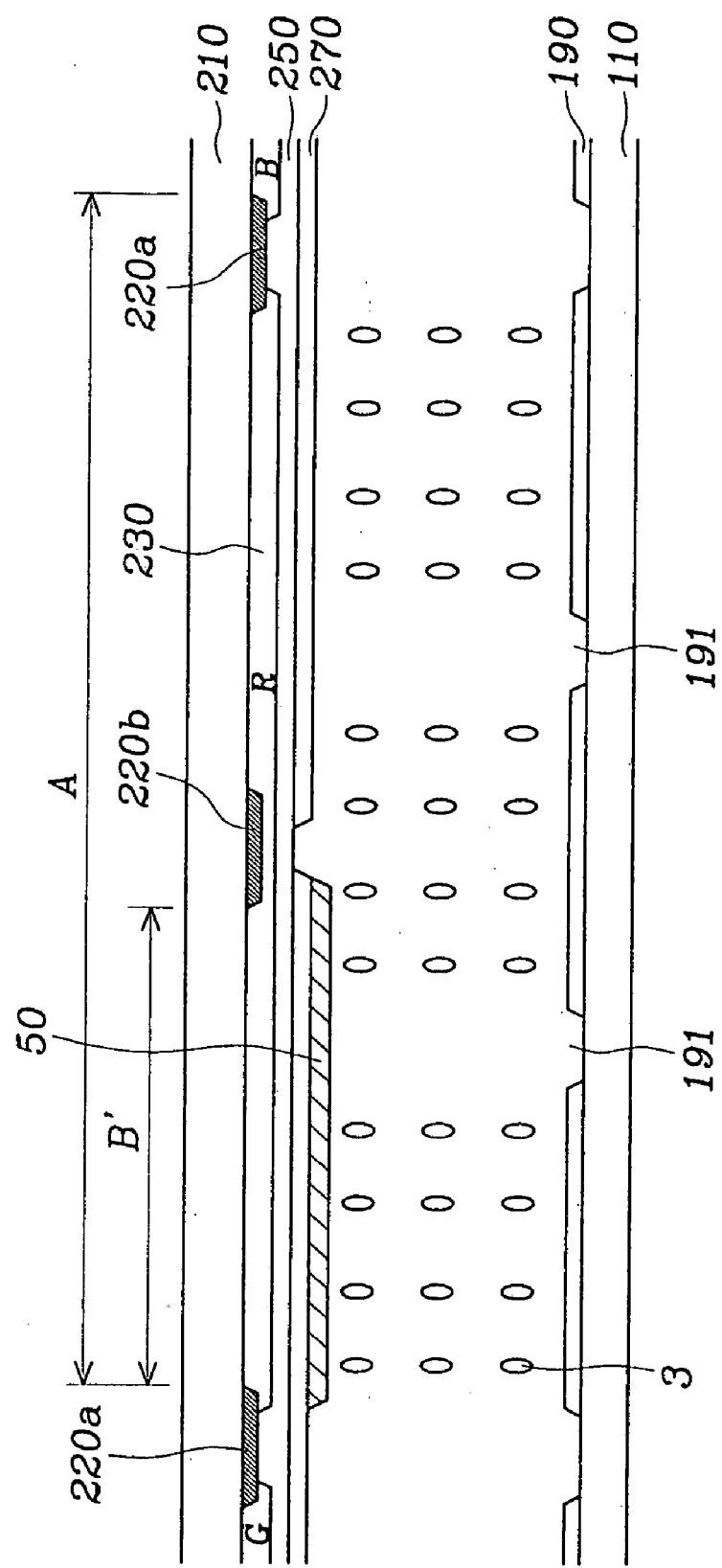

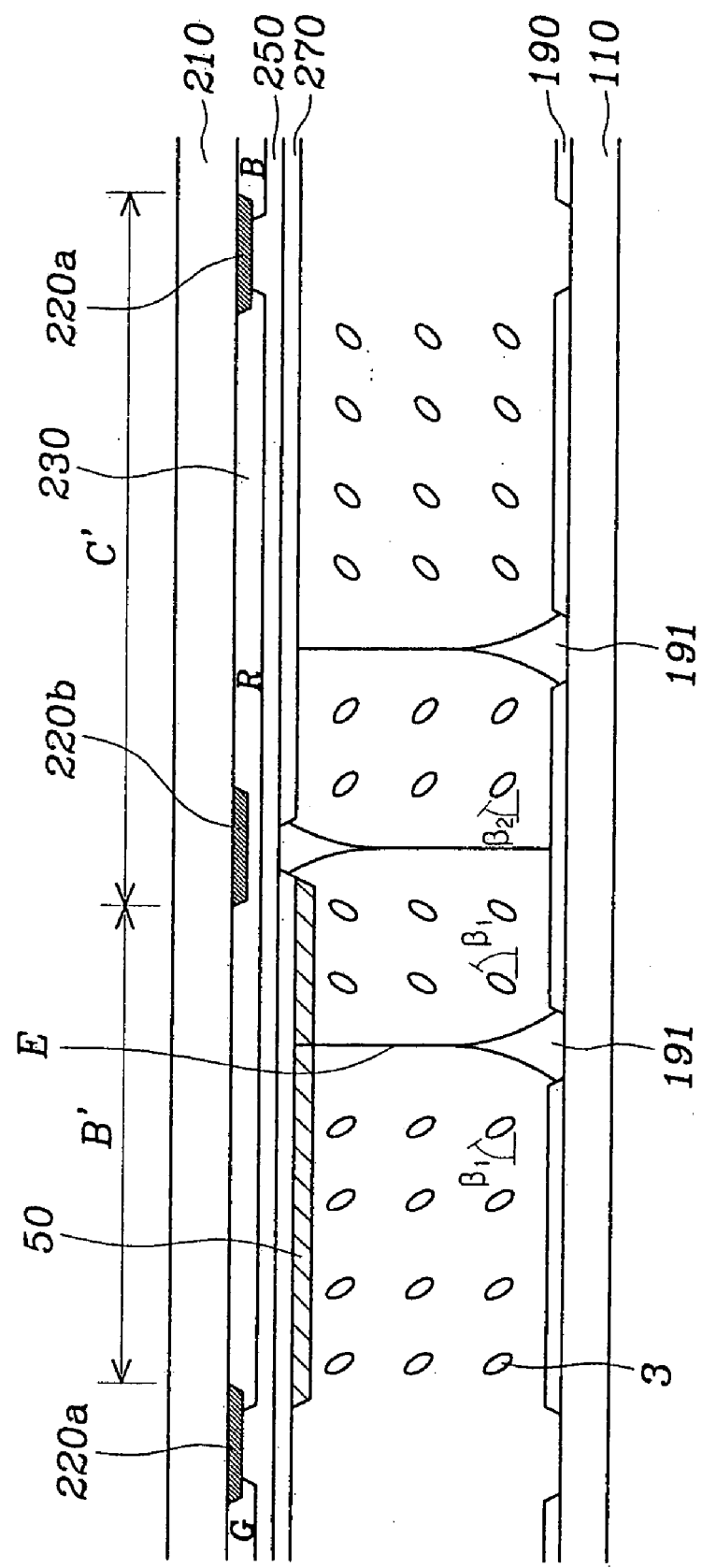

LIQUID CRYSTAL DISPLAY AND THIN FILM TRANSISTOR ARRAY PANEL

This application is a Divisional of Ser. No. 10/302,784 filed on Nov. 22, 2002.

BACKGROUND OF THE INVENTION (a) Field of the Invention

The present invention relates to a liquid crystal display and a manufacturing method thereof, and, in particular, to a liquid crystal display including a pixel electrode and a manufacturing method thereof.

(b) Description of Related Art

A typical liquid crystal display ("LCD") includes an upper panel with a common electrode and a plurality of color filters, and a lower panel with thin film transistors ("TFTs") and a plurality of pixel electrodes. A pair of alignment layers are coated on respective inner surfaces of the upper and the lower panels, and a liquid crystal layer are interposed therebetween. Different Voltages are applied to the common electrode and the pixel electrodes to generate electric field. The changes of the strength and/or the direction of the electric field change the orientations of liquid crystal molecules to vary the transmittance of light passing through the liquid crystal layer. Accordingly, desired images are obtained by adjusting the difference between the pixel electrodes and the common electrode.

Among these LCDs, a vertically aligned mode LCD (referred to as a "VALCD" hereinafter), which aligns the major axes of the liquid crystal molecules vertical to the upper and the lower panels in absence of electric field, is promising because of its high contrast ratio and wide viewing angle.

To implement wide viewing angle in the VALCD, a plurality of cutouts or a plurality of protrusions are provided on the field generating electrode(s). Both generate fringe fields to disperse tilt directions of the liquid crystal molecules into several directions, thereby giving wide viewing angle. A patterned vertically aligned mode providing cutouts in the electrodes is considered as a good substitute of an in-plane switching mode. However, the provision of cutouts itself is not sufficient in view of viewing angle.

SUMMARY OF THE INVENTION

An object of the present invention is to improve the viewing angle of an LCD.

To accomplish these and other objects, the present invention provides a liquid crystal layer having at least two different thicknesses in a pixel region.

In detail, a thin film transistor array panel is provided, which includes: an insulating substrate; a gate line formed on the insulating substrate; a data line intersecting the gate line and insulated from the gate line; a pixel electrode provided in a pixel area defined by the intersection of the gate line and the data line and including at least two portions having different heights in the pixel area; and a thin film transistor provided in a pixel area defined by the intersection of the gate line and the data line and connected to the gate line, the data line and the pixel electrode.

It is preferable that the thin film transistor array panel further includes a gate insulating layer insulating the gate line from the data line and a passivation layer insulating the data line from the pixel electrode. The preferred number of the at least two portions of the pixel electrode having different heights is two, and one of the two portions of the pixel electrode is located on the passivation layer or the gate insulating layer while the other of the two portions of the pixel electrode is located on an area without the gate insulating layer and the passivation layer. Preferably, the pixel electrode has a plurality of cutouts, at least one of the cutouts is disposed on an area without the gate insulating layer and the passivation layer and the other of the cutouts is disposed on the passivation layer.

A liquid crystal display is provided, which includes: a first insulating substrate; a gate line formed on the first insulating substrate; a data line intersecting the gate line and insulated from the gate line; a pixel electrode provided in a pixel area defined by the intersection of the gate line and the data line; a second insulating substrate facing the first insulating substrate; a common electrode formed on the second insulating substrate; a liquid crystal layer interposed between the pixel electrode and the common electrode; a first domain partitioning member provided on one of the first and the second insulating substrates; and a second domain partitioning member provided on one of the first and the second insulating substrates and partitioning the pixel area into a plurality of domains along with the first domain partitioning member, wherein the plurality of domains in the pixel area are classified into at least two types based on thickness of the liquid crystal layer.

Preferably, the first domain partitioning member includes a cutout of the pixel electrode and the second domain partitioning member includes a cutout of the common electrode. According to an embodiment of the present invention, the plurality of domains in the pixel area are classified into four groups based on tilt directions of liquid crystal molecules in the liquid crystal layer upon voltage application, and each of the four groups based on tilt directions of liquid crystal molecules in the liquid crystal layer upon voltage application includes domains of all of the at least two types classified based on thickness of the liquid crystal layer. The liquid crystal display further includes a gate insulating layer insulating the gate line from the data line and a passivation layer insulating the data line from the pixel electrode. The preferred number of the at least two types based on thickness of the liquid crystal layer is two, and the pixel electrode is located on an area with the passivation layer or the gate insulating layer and on another area without the gate insulating layer and the passivation layer. The data line may include three layers of an amorphous silicon layer, a doped amorphous silicon layer and a metal layer.

A liquid crystal display is provided, which includes: a first substrate; a plurality of pixel electrodes provided on the first substrate; an organic insulating layer formed on predetermined areas of the pixel electrodes; a second substrate located on the first substrate and separated from the first substrate with a predetermined gap; a black matrix, a color filter and a common electrode formed under the second substrate; and a liquid crystal layer interposed between the first and the second substrate.

The tilt angles of major axes of liquid crystal molecules contained in the liquid crystal layer on a region with the organic layer are different from the tilt angles of the major axes of the liquid crystal molecules on a region without the organic insulating layer.

The liquid crystal layer may have negative dielectric anisotropy. The tilt angles of the major axes of the liquid crystal molecules on the region with the organic layer are larger than the tilt angles of the liquid crystal molecules on the region without the organic insulating layer.

When pixel regions on the pixel electrodes representing red, green and blue colors are defined as R pixels, G pixels and B pixels, respectively, an area including a set of R, G and B pixels are defined as a dot, a dot with the organic insulating layer therein is defined as an organic insulating layer dot, and a dot without the organic insulating layer therein is defined as a non organic insulating layer dot, an area occupied by the organic insulating layer dot is substantially the same as an area occupied by the non organic insulating layer dot.

When a R pixel of the organic insulating layer dot is defined as a R organic insulating layer pixel, a G pixel of the organic insulating layer dot is defined as a G organic insulating layer pixel, and a B pixel of the organic insulating layer dot is defined as a B organic insulating layer pixel, about 50% of an area of each of the R, G and B organic insulating layer pixels are preferably covered with the organic insulating layer.

When four regions having different tilt directions of the liquid crystal molecules in each of the R, G and B organic insulating layer pixels are defined as first, second, third and fourth directional R, G and B organic domains, respectively, areas occupied by the first to the fourth directional R organic domains are substantially the same, areas occupied by the first to the fourth directional G organic domains are substantially the same, and areas occupied by the first to the fourth directional B organic domains may be substantially the same.

Areas occupied by the first directional R organic domain, the first directional G organic domain and the first directional B organic domain are substantially the same, areas occupied by the second directional R organic domain, the second directional G organic domain and the second directional B organic domain are substantially the same, areas occupied by the third directional R organic domain, the third directional G organic domain and the third directional B organic domain are substantially the same, and areas occupied by the fourth directional R organic domain, the fourth directional G organic domain and the fourth directional B organic domain may be substantially the same.

The organic insulating layer dots and the non organic insulating layer dots may be alternately arranged along a transverse direction.

Alternately, the organic insulating layer dots and the non organic insulating layer dots are alternately arranged along a longitudinal direction.

The non organic insulating layer dot may be adjacent to the organic insulating layer dots in four directions.

The organic insulating layer may be provided at the same directional organic domains among the R, G and B organic domains in one of the organic insulating layer dots.

The organic insulating layer may be provided at two of the first to the fourth directional organic domains of the R and B organic insulating layer pixels and at the other two of the first to fourth directional organic domains of the G organic insulating layer pixel.

It is preferable that the thickness of the organic insulating layer is equal to or less than 3.0 microns and the dielectric constant of the organic insulating layer ranges 1.5 to 7.5.

BRIEF DESCRIPTION OF THE DRAWINGS

FIGS. 24A and 24B are sectional views of the LCD according to the fourth embodiment of the present invention shown in FIG. 23 taken along the line XXIV–XXIV', which show the arrangements of the liquid crystal molecules in an normally black mode LCD in the absence of electric field and in the application of voltages, respectively;

Figure 1:
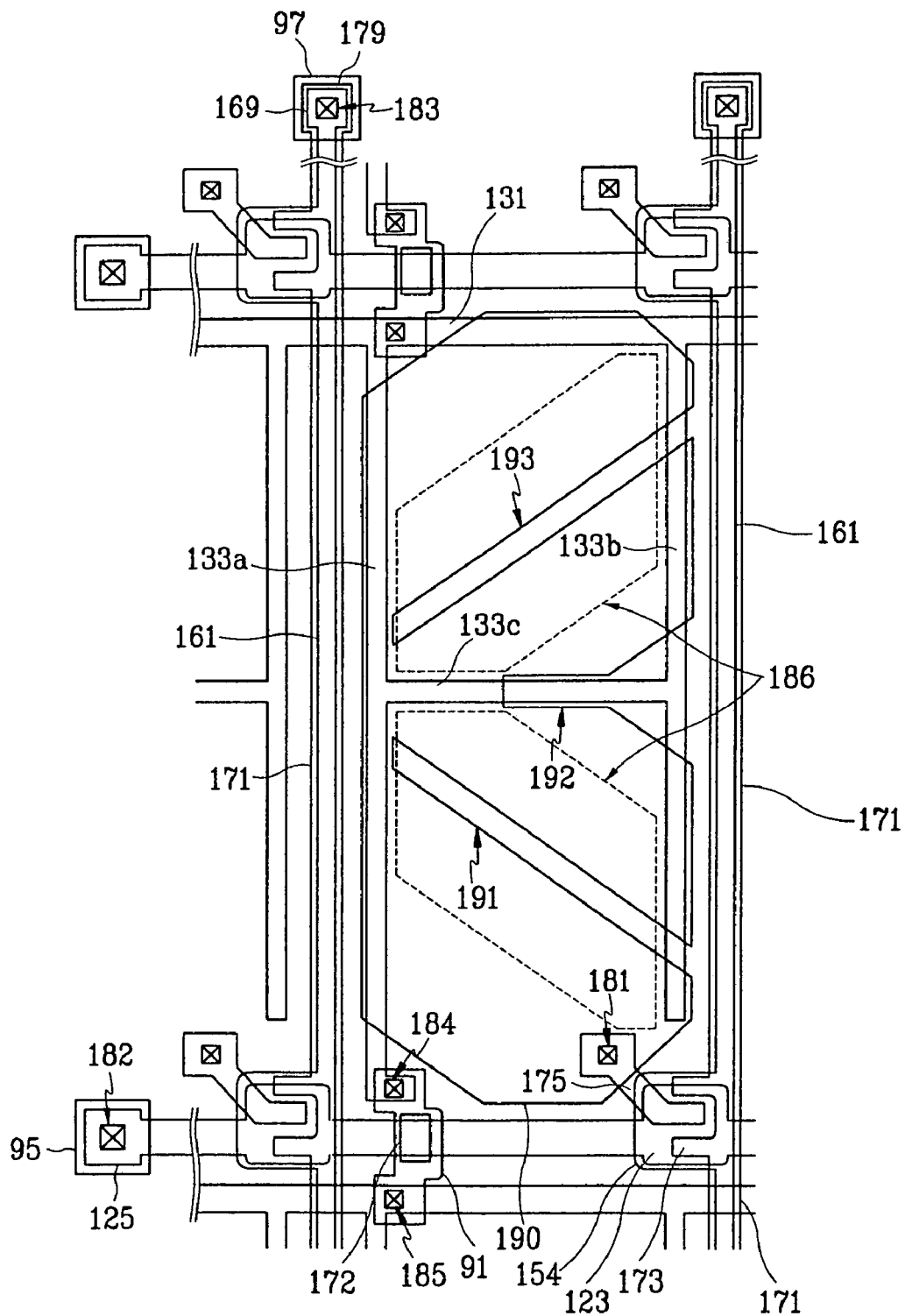
FIG. 1 is a layout view of a TFT array panel for an LCD according to a first embodiment of the present invention.

| | |
|---|---|
| 121: gate line | 123: gate electrode |
| 171: data line | 173, 175: source electrode, drain electrode |
| 140: gate insulating layer | 180: passivation layer |
| 186: recess | 190: pixel electrode |
| 191, 192, 193: cutout | 151, 154: amorphous silicon layer |
| 270: common electrode | 271, 272, 273: cutout |
| 3: liquid crystal | 50: organic insulating layer |
| 51: R organic insulating layer pixel | 52: G organic insulating layer pixel |
| 53: B organic insulating layer pixel | 54: organic insulating layer dot |
| 54: non organic insulating layer dot | 110: first substrate |
| 210: second substrate | 220a: outer black matrix |
| 220b: inner black matrix | 230: color filter |
| 250: overcoat | 291: recess of common electrode |

DETAILED DESCRIPTION OF PREFERRED EMBODIMENTS

Embodiments of the present invention will be described in detail with reference to accompanying drawings for those skilled in the art to practice easily. This invention may, however, be embodied in many different forms and should not be construed as limited to the embodiments set forth herein.

In the drawings, the thickness of layers and regions are exaggerated for clarity. Like numerals refer to like elements throughout. It will be understood that when an element such as a layer, film, region, substrate or panel is referred to as being "on" another element, it can be directly on the other element or intervening elements may also be present. In contrast, when an element is referred to as being "directly on" another element, there are no intervening elements present.

Then, thin film transistor array panels for liquid crystal displays according to embodiments of the present invention will be described with reference to the drawings.

Figure 2:
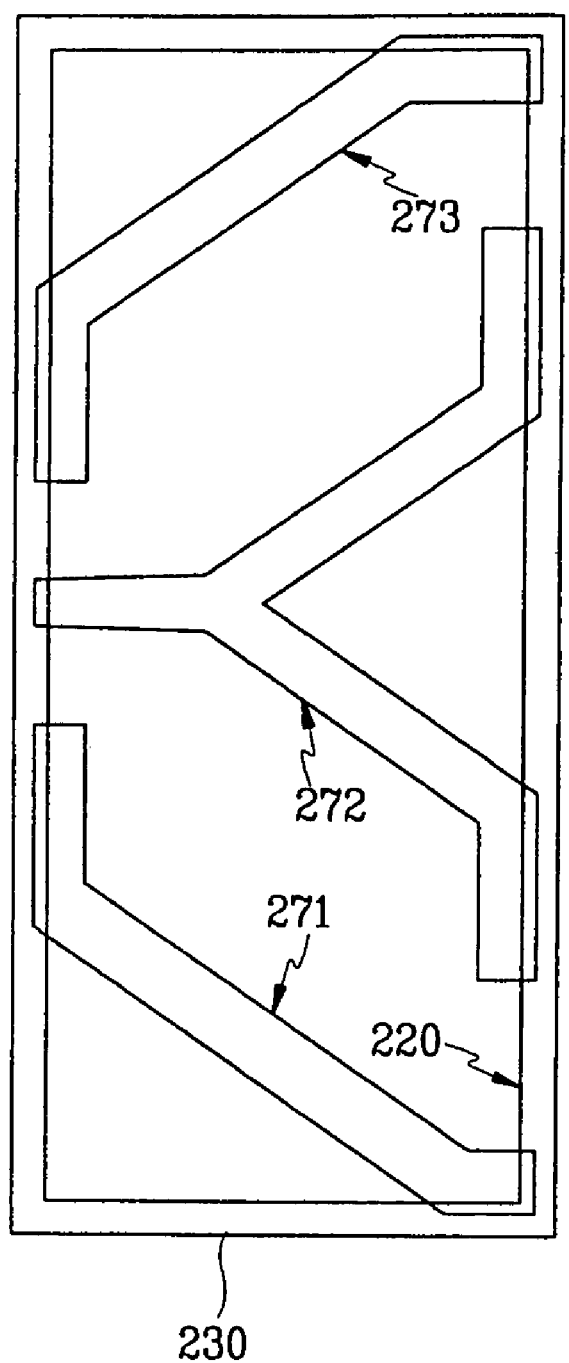
FIG. 2 is a layout view of a color filter panel for an LCD according to the first embodiment of the present invention.
Figure 3:
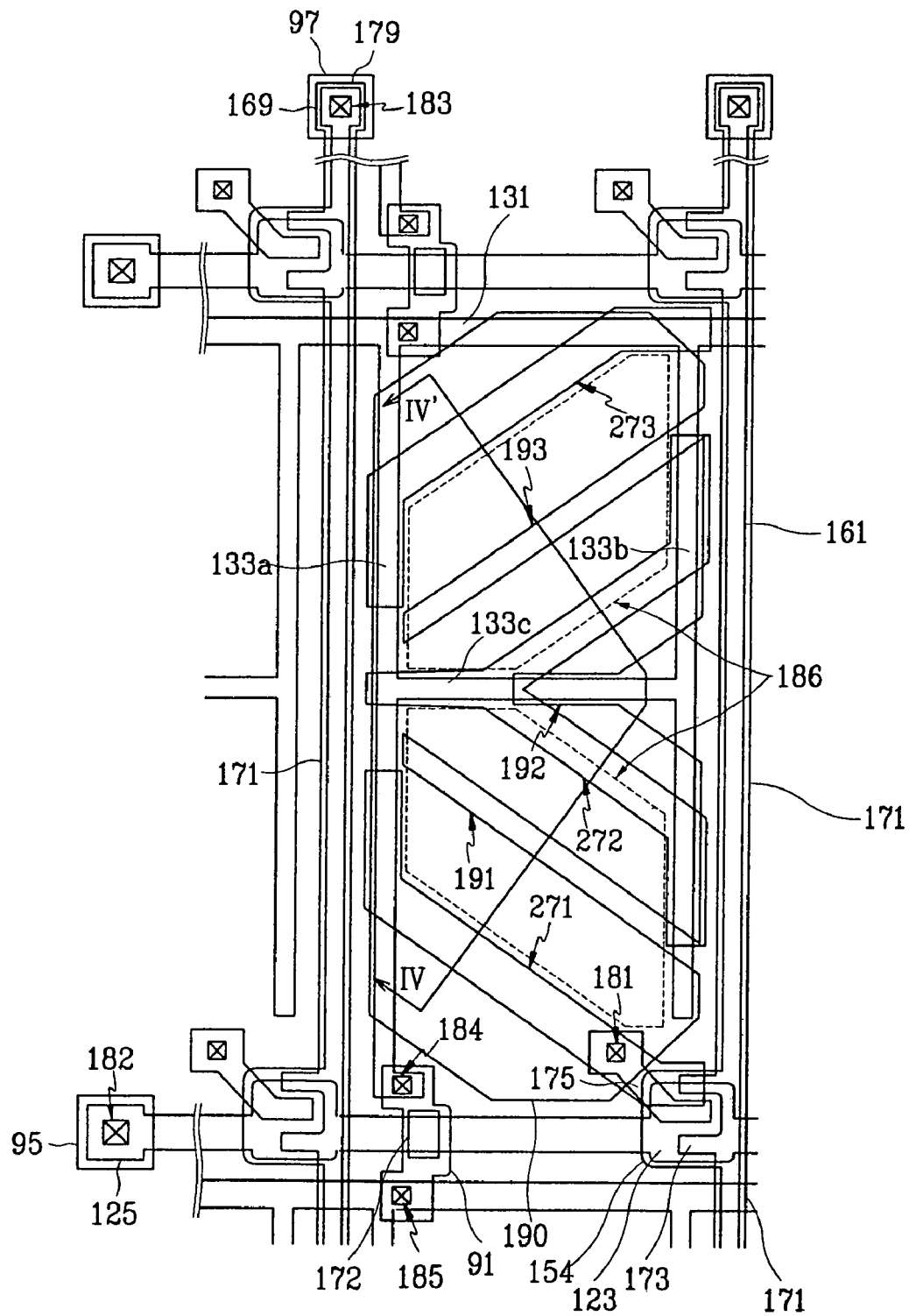
FIG. 3 is a layout view of an LCD according to the first embodiment of the present invention.
Figure 4:
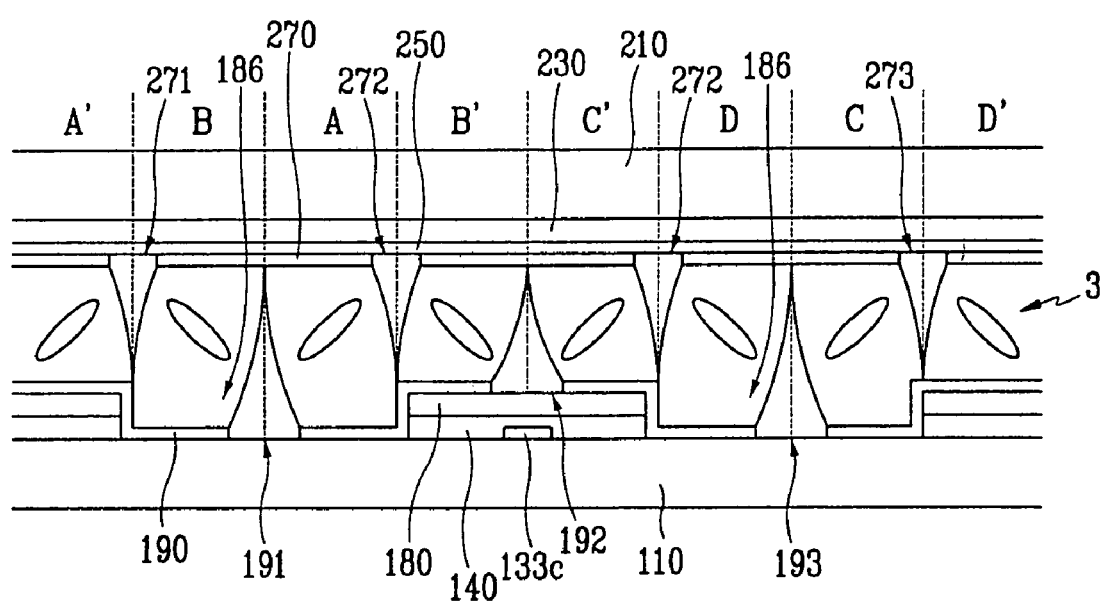
FIG. 4 is a sectional view of the LCD shown in FIG. 3 taken along the line IV–IV'.

FIG. 1 is a layout view of a TFT array panel for an LCD according to a first embodiment of the present invention, FIG. 2 is a layout view of a color filter panel for an LCD according to the first embodiment of the present invention, FIG. 3 is a layout view of an LCD according to the first embodiment of the present invention, and FIG. 4 is a sectional view of the LCD shown in FIG. 3 taken along the line IV–IV'.

An LCD includes a lower panel, an upper panel opposite thereto and a liquid crystal layer 3 interposed between the two panels and including liquid crystal molecules aligned vertical to the panels.

The structure of the lower panel will be described.

A plurality of pixel electrodes 190 are formed on an inner surface of the lower substrate 110 preferably made of transparent insulating material such as glass. The pixel electrodes 190 are preferably made of transparent conductive material such as ITO (indium tin oxide) and IZO (indium zinc oxide) and have a plurality of cutouts 191, 192 and 193. The surface of the pixel electrodes 190 has higher portions and lower portions depending on the positions. The respective pixel electrodes 190 are connected to TFTs to be applied with image signal voltages. The TFTs are connected to a plurality of gate lines 121 transmitting scanning signals and a plurality of data lines 171 transmitting image signals, to be turned on or off in response to the scanning signals. A lower polarizer 12 is attached on an outer surface of the lower substrate 110. For a reflective LCD, the pixel electrodes 190 are not made of transparent material, and the lower polarizer 12 is unnecessary.

The structure of the upper panel will be described.

A black matrix 220 for blocking light leakage, a plurality of the red, green and blue color filters 230 and a common electrode 270 preferably made of transparent conductive material such as ITO and IZO are formed on an inner surface of the upper substrate 210 preferably made of transparent insulating material such as glass. A plurality of cutouts 271, 272 and 273 are provided on the common electrode 270. Although the black matrix 220 overlaps the boundaries of pixel areas, it may further overlap the cutouts 271, 272 and 273 of the common electrode 270 in order for blocking light leakage generated by the cutouts 271, 272 and 273.

An LCD according to the first embodiment will be described more in detail.

A plurality of gate lines 121 extending substantially in a transverse direction are formed on a lower insulating substrate 110. A plurality of expansions of each gate line 121 form a plurality of gate electrodes 123, and a plurality of gate pads 125 are formed at one ends of the gate lines 121. A plurality of storage electrode lines 131 extending substantially parallel to the gate lines 121 are also formed on the insulating substrate 110. A plurality of pairs of storage electrodes 133a and 133b extending in a longitudinal direction are branched from each storage electrode line 131 are connected to each other via a storage electrode 133c extending in the transverse direction. The number of the storage electrode lines 131 may be two or more. The gate lines 121, the gate electrodes 123, the storage electrode lines 131 and the storage electrodes 133a, 133b, 133c and 133d are preferably made of metal such as Al or Cr. They include either a single layer or double layers preferably including sequentially deposited Cr and Al layers. Alternatively, they include a variety of metals.

A gate insulating layer 140 preferably made of SiNx is formed on the gate lines 121, the storage electrode lines 131 and the storage electrodes 133a, 133b, 133c and 133d.

A plurality of data lines 171 extending in the longitudinal direction are formed on the gate insulating layer 140. A plurality of branches of each data line 171 form a plurality of source electrodes 173 and a plurality of drain electrodes 175 are formed adjacent to the respective source electrodes 173. A plurality of data pads 179 are formed at one ends of the data lines 171. In addition, a plurality of under-bridge metal pieces 172 overlapping the gate lines 121 are formed on the gate insulating layer 140. The data lines 171, the source electrodes 173, the drain electrodes 175 and the data pads 179 are preferably made of Cr or Al like the gate wire. They may also have a single-layered structure or a multiple-layered structure.

A plurality of channel portions 154 of an amorphous silicon layer 151 and 154 used as channel portions of TFTs are formed under the source electrodes 173 and the drain electrodes 175, and a plurality of data portions 151 of the amorphous silicon layer 151 and 154 extending in the longitudinal direction and connecting the amorphous silicon channel portions 154 are formed under the data lines 171. A contact layer 161 and 169 for reducing the contact resistance between the source and the drain electrodes 173 and 175 and the amorphous silicon channel portions 154 is formed on the amorphous silicon layer 151 and 154. The contact layer 161 and 169 is preferably made of amorphous silicon heavily doped with N-type impurity.

A passivation layer 180 preferably made of inorganic insulator such as SiNx or organic insulator such as resin is formed on the data lines 171 and the like. A plurality of contact holes 181 exposing the drain electrodes 175 are provided in the passivation layer 180. The passivation layer 180 and the gate insulating layer 140 have filmless areas 186 provided for differentiating the height of a pixel electrode 190 between domains. The filmless areas 186 are indicated by dotted lines as shown in FIGS. 1 and 3 and cover four domains located both sides of a first cutout 191 and a third cutout 193 of a pixel electrode 190. FIG. 4 shows the domains provided with the filmless areas 186 represented by A, B, C and D.

A plurality of pixel electrodes 190, each having a plurality of cutouts 191, 192 and 193, are formed on the passivation layer 180. The pixel electrodes 190 are preferably made of a transparent conductor such as ITO or IZO or an opaque conductor having an excellent light-reflecting characteristic such as Al. The cutouts 191, 192 and 193 on each pixel electrode 190 include a transverse cutout 192 extending in the transverse direction and located at a position so as to partition the pixel electrode 190 into upper and lower halves arranged in the longitudinal direction, and two oblique cutouts 191 and 193 extending in oblique directions and located respectively in the lower and the upper halves of the pixel electrodes 190. The extensions of the oblique cutouts 191 and 193 are perpendicular to each other in order for regularly distributing the field directions of the fringe fields into four directions. The pixel electrode 190 has lower portions (located in the filmless areas 186) and higher portions (located on the passivation layer 180) due to the filmless areas 186.

In addition, a plurality of storage connections or bridges 91, which connect the storage electrodes 133a to the storage electrode lines 131 opposite thereto with respect to the gate lines 121, are formed on the passivation layer 180. The storage bridges 91 contact the storage electrodes 133a and the storage electrode lines 131 via a plurality of contact holes 183 and 184 provided both in the passivation layer 180 and the gate insulating layer 140. The storage bridges 91 overlap the under-bridge metal pieces 172. The storage bridges 91 electrically connect all the storage wire on the lower substrate 110. This storage wire, if necessary, may be used for repairing the defects of the gate lines 121 and/or the data lines 171, and the under-bridge metal pieces 172 are used for enhancing electrical connections between the gate lines 121 and the storage bridges 91 when irradiating a laser beam for such repair.

A plurality of subsidiary gate pads 95 and a plurality of subsidiary data pads 97 are formed on the passivation layer. The subsidiary gate pad 95 is connected to the gate pad 125 through a contact hole 182 provided at both the passivation layer 180 and the gate insulating layer 140, and the subsidiary data pad 97 is connected to the data pad 179 through a contact hole provided at the passivation layer 180.

A black matrix 220 for blocking light leakage is formed on an upper substrate 210. A plurality of red, green and blue color filters 230 are formed on the black matrix 220. A common electrode 270 having a plurality of sets of cutouts 271, 272 and 273 are formed on the color filters 230. The common electrode 270 is preferably made of a transparent conductor such as ITO or IZO.

Each set of the cutouts 271, 272 and 273 of the common electrode 270 interpose the oblique cutouts 191 and 193 of the pixel electrode 190 between two adjacent cutouts 271, 272 and 273. Each cutout 271, 272 or 273 includes an oblique portion or portions parallel to the oblique cutouts 191 and 193 and transverse and longitudinal portions overlapping the edges of the pixel electrodes 190.

A basic structure of an LCD according to the present invention is prepared by aligning and combining the TFT array panel and the color filter panel having the above-described configurations and injecting liquid crystal material therebetween to be vertically aligned. When the TFT array panel and the color filter panel are aligned, the cutouts 191, 192 and 193 of the pixel electrodes 190 and the cutouts of the common electrode 271, 272 and 273 divide the respective pixel areas into several small domains. The domains are long such that their width and length are distinguished. These small domains are classified into four types based on average direction of major axes of liquid crystal molecules therein under the application of electric field. A and A'; B and B'; C and C'; and D and D' shown in FIG. 4 are the same types, respectively. The small domains of the same type are classified again based on their cell gaps. The domains A, B, C and D have larger cell gaps while A', B', C' and D' have smaller cell gaps. It is preferred that the domains with larger cell gaps and the domains with smaller cell gaps have equal planar areas. However, the equality may be removed for improving visibility for particular viewing directions.

As described above, the domains of the same type having different cell gaps have different field distributions and different retardations, thereby compensating for the brightness to improve the lateral visibility.

Now, methods of manufacturing a TFT array panel for an LCD according to embodiments of the present invention, which provides above-described structure and effect, will be described.

FIGS. 5 to 9 are sectional views sequentially illustrating a method of manufacturing a TFT array panel for an LCD according to a first embodiment of the present invention.

Figure 5:
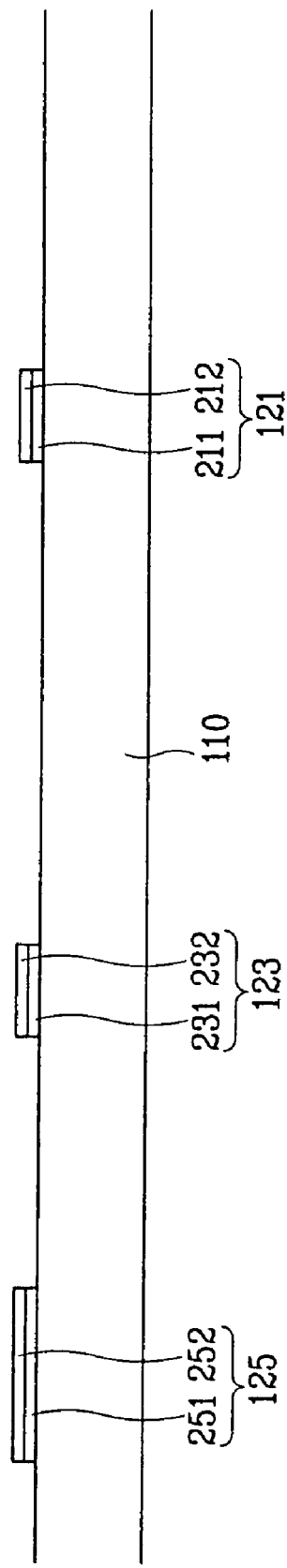
FIGS. 5 to 9 are sectional views of a TFT array panel for an LCD sequentially showing the steps of a manufacturing method thereof according to the first embodiment of the present invention.

As shown in FIG. 5, a first gate wire layer 211, 231 and 251 preferably made of Cr or Mo alloy having excellent physical and chemical characteristics and a second gate wire layer 212, 232 and 252 preferably made of Al or Ag alloy having a low resistivity are deposited on a substrate 110 and patterned to form a gate wire including a plurality of gate lines 121, a plurality of gate electrodes 123 and a plurality of gate pads 125 and extending substantially in the transverse direction. At this time, although not shown, a storage electrode wire is also formed (A First Mask).

For the first gate wire layer 211, 231 and 251 of Mo alloy and the second gate wire layer 212, 232 and 252 of Ag alloy, both layers are etched by an etchant for Al alloy such as a mixture of phosphoric acid, nitric acid, acetic acid and deionized water. Thus, the formation of the gate wire 121, 123 and 125 including double layers is completed by using a single etching process. Since the etching ratio of the mixture of phosphoric acid, nitric acid, acetic acid and deionized water for Ag alloy is higher than that for Mo alloy, a taper angle of 30 degrees required for the gate wire can be obtained.

Figure 6:
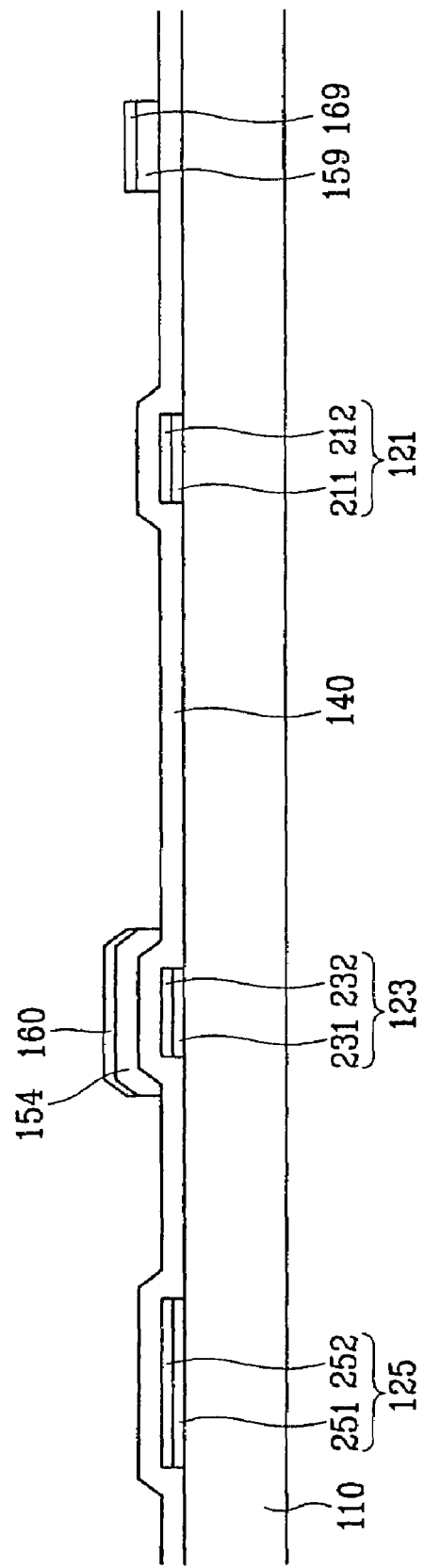

Next, as shown in FIG. 6, three layers, a gate insulating layer 140 preferably made of SiNx, an amorphous silicon layer and a doped amorphous silicon layer are deposited sequentially, and the amorphous silicon layer and the doped amorphous silicon layer are photo-etched together to form a amorphous silicon layer 154 and 159 and an ohmic contact layer 160 and 169 on the gate insulating layer 140 opposite the gate electrodes 123 (A Second Mask).

Figure 7:
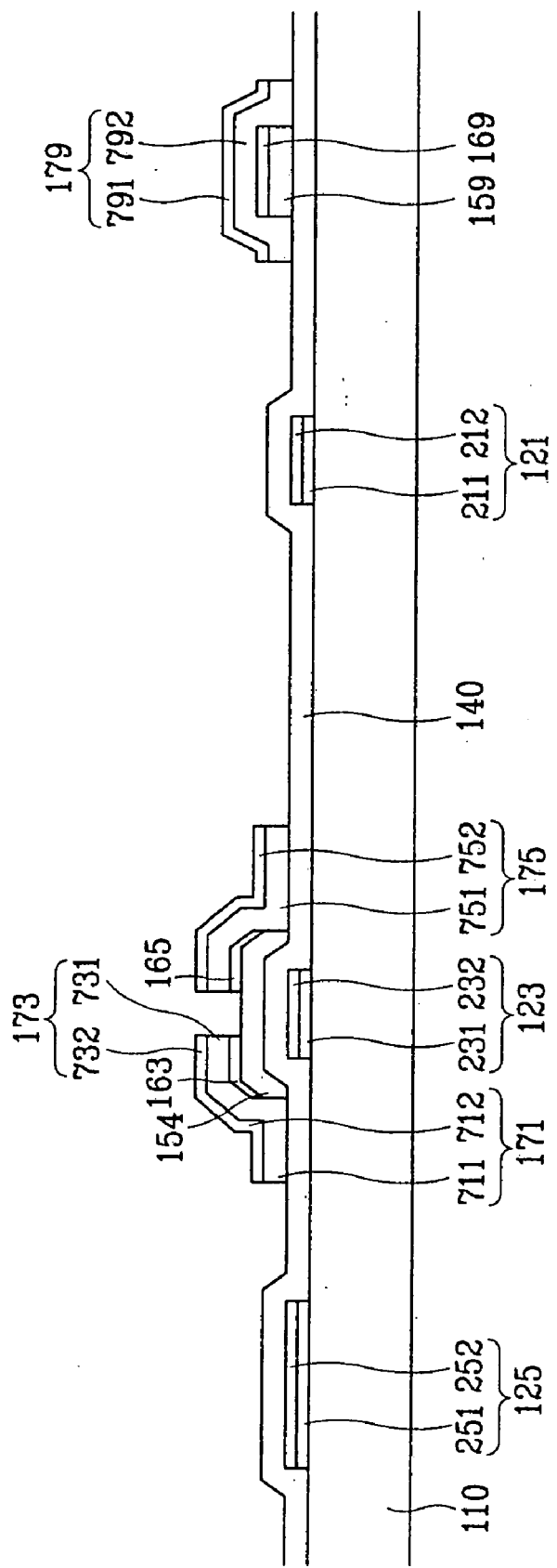

Subsequently, as shown in FIG. 7, a first data wire layer 711, 731, 751 and 791 preferably made of Cr or Mo alloy and a second data wire layer 712, 732, 752 and 792 preferably made of Al or Ag alloy are deposited and photo-etched to form a data wire. The data wire include a plurality of data lines 171 intersecting the gate line 121, a plurality of source electrodes 173 connected to the data lines 171 and extending onto the gate electrodes 121, a plurality of data pads 179 connected to one ends of the data lines 171 and a plurality of drain electrodes 175 separated from the source electrodes 173 and opposite the source electrodes 173 with respect to the gate electrodes 121 (A Third Mask).

Thereafter, portions of the doped amorphous silicon layer pattern 160, which are not covered by the data wire 171, 173, 175 and 179, are etched such that the doped amorphous silicon layer pattern 160 is separated into two portions 163 and 165 opposite each other with respect to the gate electrodes. 123 to expose portions of the amorphous silicon pattern 154 between the two portions of the doped amorphous silicon layer 163 and 165. Oxygen plasma treatment is preferably performed in order to stabilize the exposed surfaces of the amorphous silicon layer 154.

Figure 8:
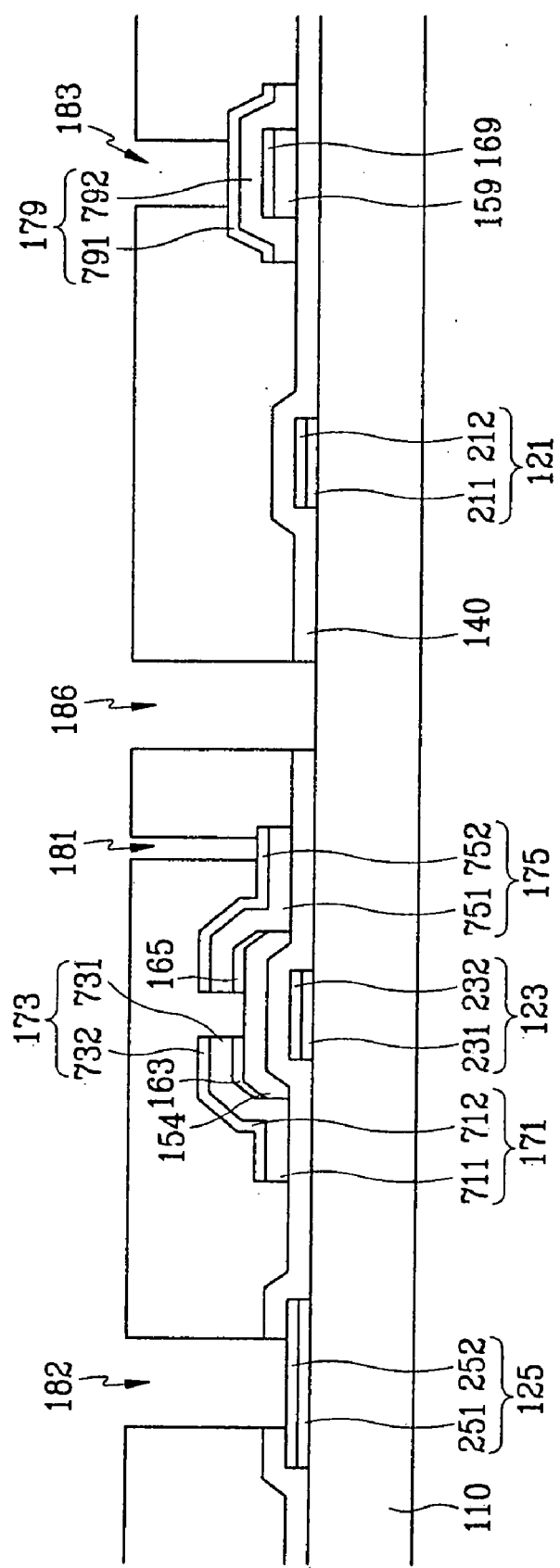
Figure 9:
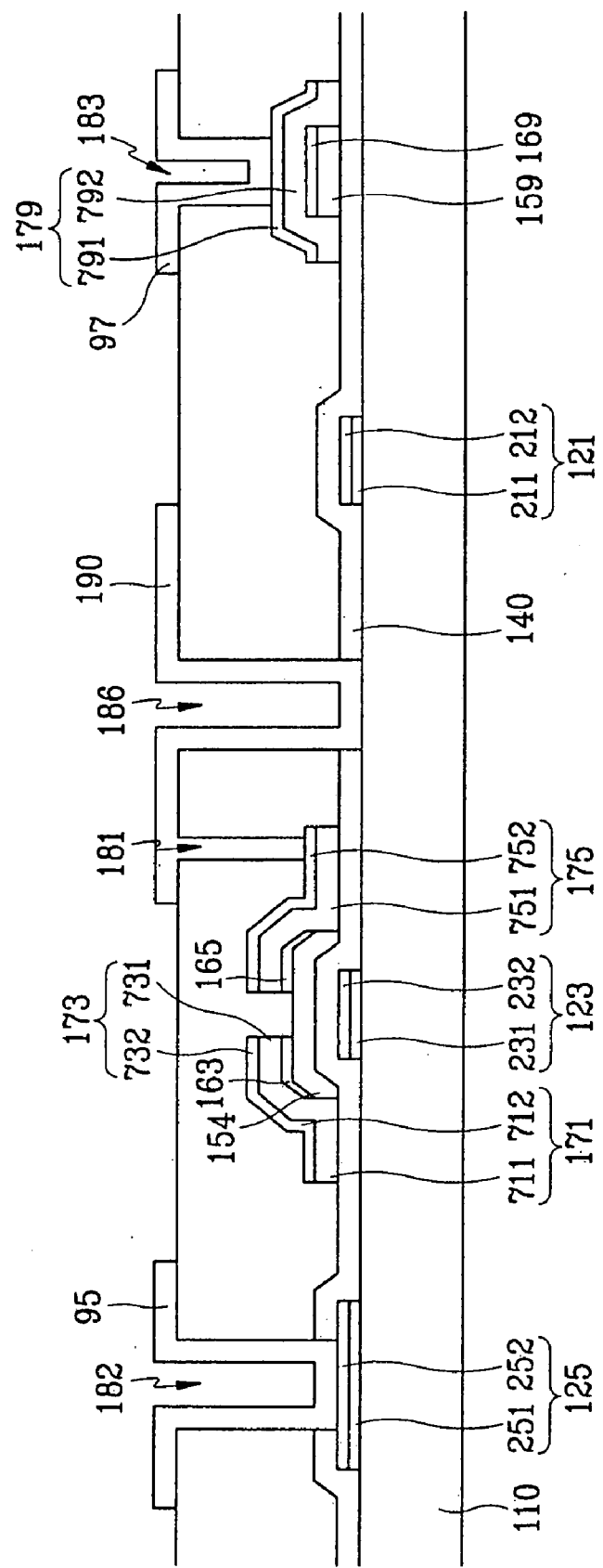

Next, as shown in FIG. 8, a passivation layer 180 is formed by growing a a-Si:C:O film or a a-Si:O:F film by chemical vapor deposition ("CVD"), by depositing an inorganic insulating film such as SiNx, or by coating an organic insulating film such as acryl-based material. The deposition of the a-Si:C:O film is performed by using $SiH(CH_3)_3$, $SiO_2(CH_3)_4$, $(SiH)_4O_4(CH_3)_4$, $Si(C_2H_5O)_4$, etc., in gaseous states as a basic source, and flowing a gas mixture of an oxidizer such as $N_2O$ and $O_2$ and Ar or He. The deposition of the a-Si:O:F film is performed in the flow of a gas mixture of $O_2$ and $SiH_4$, $SiF_4$, etc. $CF_4$ may be added as an auxiliary source of fluorine. (A Second Mask)

The passivation layer 180 is patterned together with the gate insulating layer 140 by a photo etching process to form a plurality of contact holes 181, 182 and 183 exposing the gate pads 125, the drain electrodes 175 and the data pads 179 and a plurality of filmless areas 186. Here, the planar shapes of the contact holes 181, 182 and 183 are polygonal or circular. It is preferable that the area of each of the contact holes 181 and 183 exposing the pads 125 and 179 is equal to or larger than 0.5 mm×15 μm and equal to or less than 2 mm×60 μm. Although not shown, a plurality of contact holes for contacting storage bridges with the storage electrode lines and the storage electrodes are also formed in this step (A Fourth Mask).

Finally, as shown in FIG. 17, an ITO layer or an IZO layer is deposited and photo-etched to a plurality of pixel electrodes 190, a plurality of auxiliary gate pads 95 and a plurality of auxiliary data pads 97. Each pixel electrode 190 is connected to the drain electrode 175 via the first contact hole 181, and each of the auxiliary gate pad 95 and the auxiliary data pad 97 are connected to the gate pad 95 and the data pad 97 via the second and the third contact holes 182 and 183. A pre-heating process using nitrogen gas is preferably performed before depositing ITO or IZO. This is required for preventing the formation of metal oxides on the exposed portions of the metal layers through the contact holes 181, 182 and 183. Although not shown, a plurality of storage bridges is also formed in this step, and a photo-mask is designed such that the cutouts of the pixel electrodes 190 have an inversion symmetry with respect to the data lines 171 (A Fifth Mask).

A TFT array panel according to an embodiment of the present invention can be manufactured using four masks. A TFT array panel manufactured using four masks and a manufacturing method thereof will be described.

First, a structure of a TFT array panel manufactured using four masks are considered.

Figure 10:
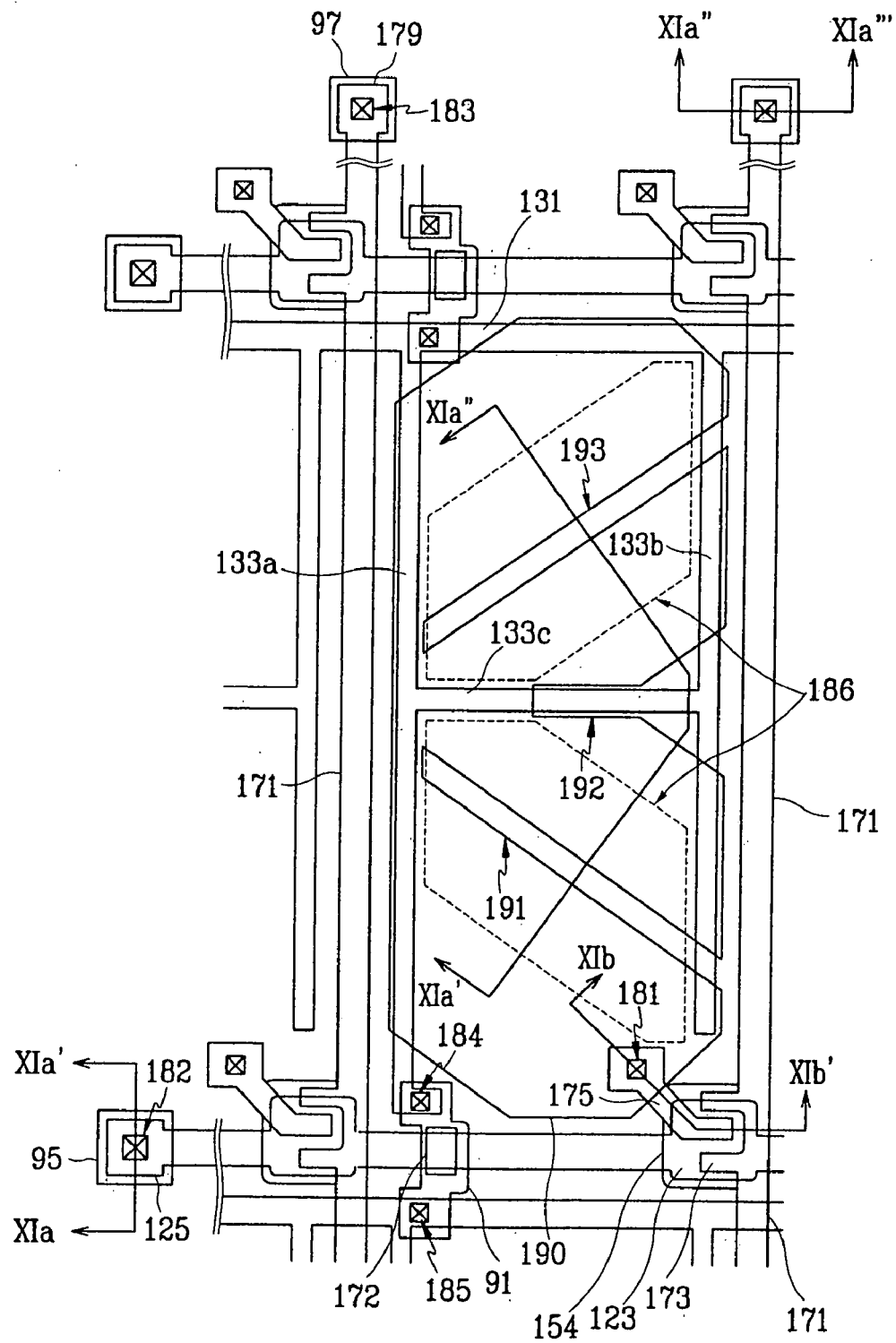
FIG. 10 is a layout view of an LCD according to the second embodiment of the present invention.

FIG. 10 is a layout view of a TFT array panel for an LCD according to a second embodiment of the present invention, FIG. 11 is a sectional view of the TFT array panel shown in FIG. 10 taken along the lines XIa–XIa', XIa'–XIa" and XIa"–XIa'", and FIG. 12 is a sectional view of the TFT array panel shown in FIG. 10 taken along the lines XIb–XIb'.

A plurality of gate lines 121 extending substantially in a transverse direction are formed on an insulating substrate 110. A plurality of expansions of each gate line 121 form a plurality of gate electrodes 123, and a plurality of gate pads. 125 are formed at one ends of the gate lines 121. A plurality of storage electrode lines 131 extending substantially parallel to the gate lines 121 are also formed on the insulating substrate 110. A plurality of pairs of storage electrodes 133a and 133b extending in a longitudinal direction are branched from each storage electrode line 131 are connected to each other via a storage electrode 133c extending in the transverse direction. The number of the storage electrode lines 131 may be two or more. The gate lines 121, the gate electrodes 123, the storage electrode lines 131 and the storage electrodes 133a, 133b, 133c and 133d are preferably made of metal such as Al or Cr. They include double layers preferably including sequentially deposited Cr and Al layers. Alternatively, they include a variety of metals. Alternately, the gate wire and the storage wire have either a single-layered structure or triple-layered structure.

A gate insulating layer 140 preferably made of SiNx is formed on the gate lines 121, the storage electrode lines 131 and the storage electrodes 133a, 133b, 133c and 133d.

A plurality of data lines 171 extending in the longitudinal direction are formed on the gate insulating layer 140. A plurality of branches of each data line 171 form a plurality of source electrodes 173 and a plurality of drain electrodes 175 are formed adjacent to the respective source electrodes 173. A plurality of data pads 179 are formed at one ends of the data lines 171. In addition, a plurality of under-bridge metal pieces 172 overlapping the gate lines 121 are formed on the gate insulating layer 140. The data lines 171, the source electrodes 173, the drain electrodes 175 and the data pads 179 have a double-layered structure including a Cr layer 731, 751 and 791 and an Al layer 732, 752 and 792 like the gate wire. They may also have a single-layered structure or a multiple-layered structure.

A plurality of channel portions 154 of an amorphous silicon layer 151 and 154 used as channel portions of TFTs are formed under the source electrodes 173 and the drain electrodes 175, and a plurality of data portions 151 of the amorphous silicon layer 151 and 154 extending in the longitudinal direction and connecting the amorphous silicon channel portions 154 are formed under the data lines 171. A contact layer 163, 165 and 169 for reducing the contact resistance between the source and the drain electrodes 173 and 175 and the amorphous silicon channel portions 154 is formed on the amorphous silicon layer 151 and 154. The contact layer 161, 165 and 169 is preferably made of amorphous silicon heavily doped with N-type impurity. The contact layer 161, 165 and 169 has substantially the same shape as the data wire 171, 173, 175 and 179, and the amorphous silicon layer 154 and 151 has the same shape as the data wire 171 and 179 except for the channel portions 154. In other words, the data wire is said to include a metal layer, a contact layer and an amorphous silicon layer.

A passivation layer 180 preferably made of inorganic insulator such as SiNx or organic insulator such as resin is formed on the data lines 171 and the like. A plurality of contact holes 181 exposing the drain electrodes 175 are provided in the passivation layer 180. The passivation layer 180 and the gate insulating layer 140 have filmless areas 186 provided for differentiating the height of a pixel electrode 190 between domains. The filmless areas 186 are indicated by dotted lines as shown in FIG. 10 and cover four domains located both sides of a first cutout 191 and a third cutout 193 of a pixel electrode 190.

A plurality of pixel electrodes 190, each having a plurality of cutouts 191, 192 and 193, are formed on the passivation layer 180. The pixel electrodes 190 are preferably made of a transparent conductor such as ITO or IZO or an opaque conductor having an excellent light-reflecting characteristic such as Al. The cutouts 191, 192 and 193 on each pixel electrode 190 include a transverse cutout 192 extending in the transverse direction and located at a position so as to partition the pixel electrode 190 into upper and lower halves arranged in the longitudinal direction, and two oblique cutouts 191 and 193 extending in oblique directions and located respectively in the lower and the upper halves of the pixel electrodes 190. The extensions of the oblique cutouts 191 and 193 are perpendicular to each other in order for regularly distributing the field directions of the fringe fields into four directions. The pixel electrode 190 has lower portions (located in the filmless areas 186) and higher portions (located on the passivation layer 180) due to the filmless areas 186.

In addition, a plurality of storage connections or bridges 91, which connect the storage electrodes 133a to the storage electrode lines 131 opposite thereto with respect to the gate lines 121, are formed on the passivation layer 180. The storage bridges 91 contact the storage electrodes 133a and the storage electrode lines 131 via a plurality of contact holes 183 and 184 provided both in the passivation layer 180 and the gate insulating layer 140. The storage bridges 91 overlap the under-bridge metal pieces 172. The storage bridges 91 electrically connect all the storage wire on the lower substrate 110. This storage wire, if necessary, may be used for repairing the defects of the gate lines 121 and/or the data lines 171, and the under-bridge metal pieces 172 are used for enhancing electrical connections between the gate lines 121 and the storage bridges 91 when irradiating a laser beam for such repair.

A plurality of subsidiary gate pads 95 and a plurality of subsidiary data pads 97 are formed on the passivation layer. The subsidiary gate pad 95 is connected to the gate pad 125 through a contact hole 182 provided at both the passivation layer 180 and the gate insulating layer 140, and the subsidiary data pad 97 is connected to the data pad 179 through a contact hole provided at the passivation layer 180.

A color filter panel for an LCD according to the second embodiment of the present invention has substantially the same shape as the first embodiment. Accordingly, an LCD having the section shown in FIG. 4 is obtained by assembling the TFT array panel described with reference to FIGS. 10, 11a and 11b and a color filter panel.

FIGS. 12A to 18B are sectional views of a TFT array panel for an LCD sequentially showing the steps of a manufacturing method thereof according to a second embodiment of the present invention.

Figure 12A:
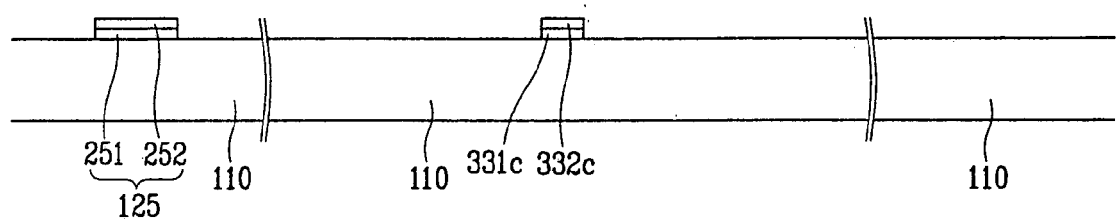
FIGS. 12A to 18B are sectional views of a TFT array panel for an LCD sequentially showing the steps of a manufacturing method thereof according to the second embodiment of the present invention.
Figure 12B:
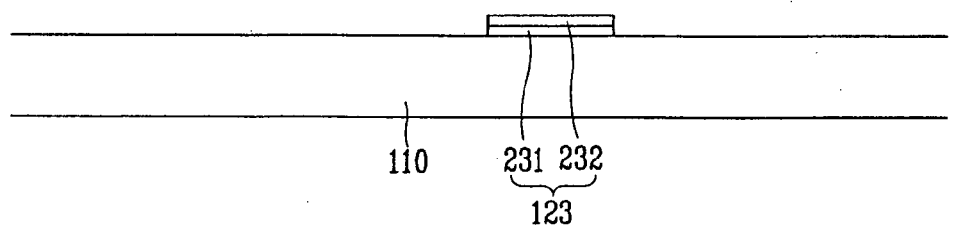

First, as shown in FIGS. 12A and 12B, a first gate wire layer 231, 251 and 331c preferably made of Cr or Mo alloy having excellent physical and chemical characteristics and a second gate wire layer 232, 252 and 332c preferably made of Al or Ag alloy having a low resistivity are deposited on a substrate 110 and patterned to form a gate wire including a plurality of gate lines 121, a plurality of gate electrodes 123 and a plurality of gate pads 125 and a storage electrode wire 131, 133a, 133b, 133c and 133d (A First Mask).

Figure 13A:
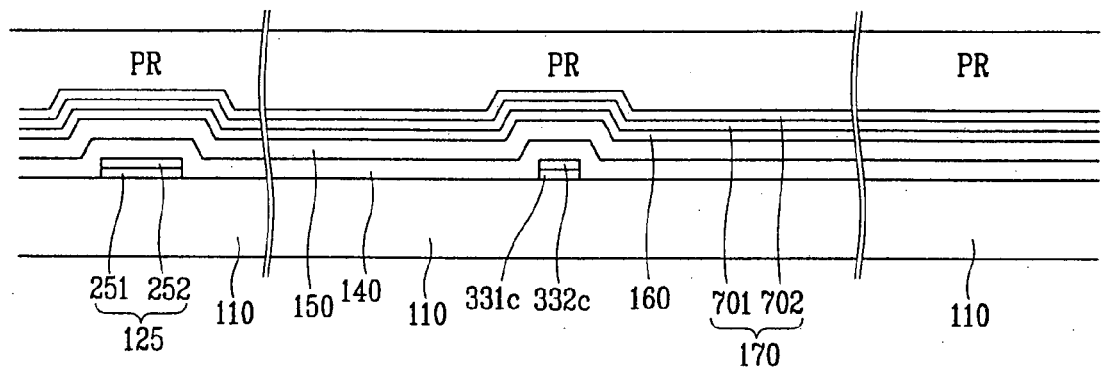
Figure 13B:
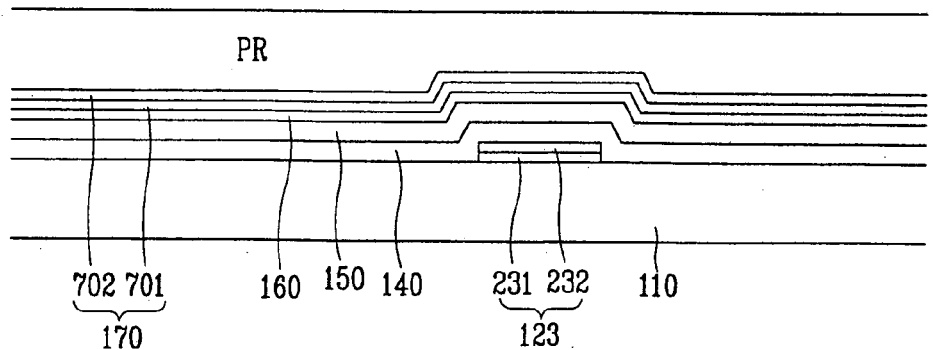

Next, as shown in FIGS. 13A and 13B, a gate insulating layer 140 of SiNx, a amorphous silicon layer 150, and a contact layer 160 are sequentially deposited by CVD such that the layers 30, 40 and 50 bear thickness of 1,500–5,000 Å, 500–2,000 Å and 300–600 Å, respectively. A first conductive film 701 preferably made of Cr or Mo alloy and a second conductive film 702 preferably made of Al or Ag alloy are deposited by sputtering to form a conductive layer 170. Thereafter, a photoresist film PR with the thickness of 1–2 microns is coated thereon.

Figure 14A:
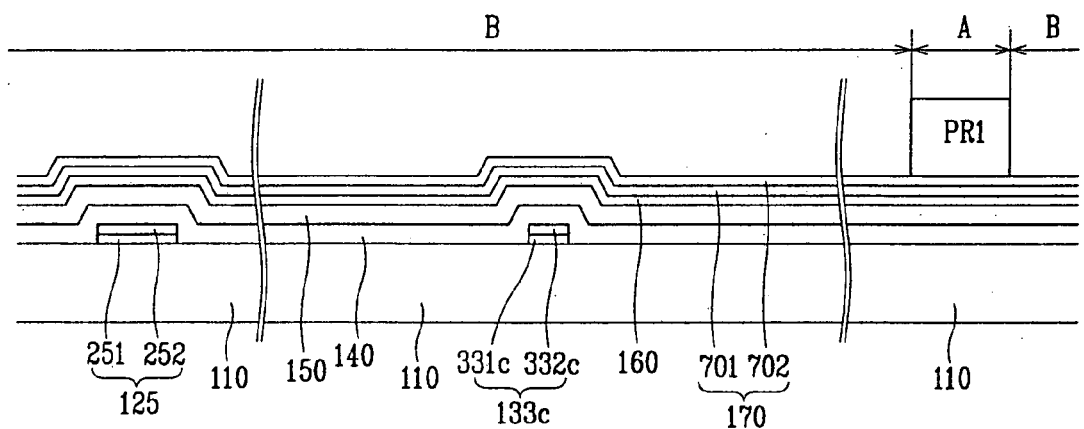
Figure 14B:
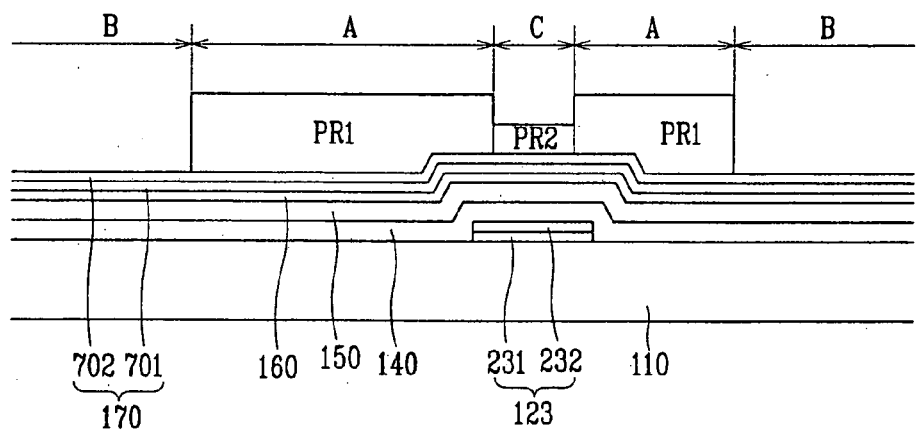

Subsequently, the photoresist film PR is exposed to light through a mask, and developed to form a photoresist pattern PR2 and PR1 as shown in FIGS. 14A and 14B. Second portions PR2 of the photoresist pattern PR2 and PR1, which are located on channel areas C of TFTs between source and drain electrodes 173 and 175, are established to bear thickness smaller than that of the first portions PR1 on data areas A where the data wire is formed. The portions of the photoresist film on the remaining area B are removed. The thickness ratio of the second portions PR2 on the channel areas C to the first portions PR1 on the data areas A is adjusted depending upon the etching conditions in the etching steps to be described later. It is preferable that the thickness of the second portions PR2 is equal to or less than half of the thickness of the first portions PR1, in particular, equal to or less than 4,000 Å (A Second Mask).

The position-dependent thickness of the photoresist film is obtained by several techniques. In order to adjust the amount of light exposure in the areas C, a slit pattern, a lattice pattern or translucent films are provided on a mask.

When using a slit pattern, it is preferable that the width of the portions between the slits or the distance between the portions, i.e., the width of the slits is smaller than the resolution of an exposer used for the photolithography. In case of using translucent films, thin films with different transmittances or with different thicknesses may be used to adjust the transmittance of the mask.

When the photoresistive film is irradiated with light through such a mask, polymers of the portions directly exposed to the light are almost completely decomposed, and those of the portions facing the slit pattern or the translucent films are not completely decomposed due to the small amount of light exposure. The polymers of the portions blocked by light-blocking films are hardly decomposed. Development of the photoresistive film makes the portions having the polymers, which are not decomposed, to be left, and makes the portions exposed to the smaller light irradiation to be thinner than the portions which do not experience the light exposure. Here, it is required not to make the exposure time long enough to decompose all the molecules.

The thin portions PR2 of the photoresist pattern may be obtained by performing a reflow process to flow a reflowable photoresist film into the areas without the photoresist film after exposing to light and developing the photoresist film, using a usual mask with transmissive areas completely transmitting the light and blocking areas completely blocking the light.

Thereafter, the photoresist pattern PR2 and the underlying layers, i.e., the conductive layer 170, the contact layer 150 and the amorphous silicon layer 150 are etched such that a data wire and the underlying layers are left over on the data areas A, only the amorphous silicon layer is left over on the channel areas C, and all of the three layers 170, 160 and 150 are removed from the remaining areas B to expose the gate insulating layer 140.

Figure 15A:
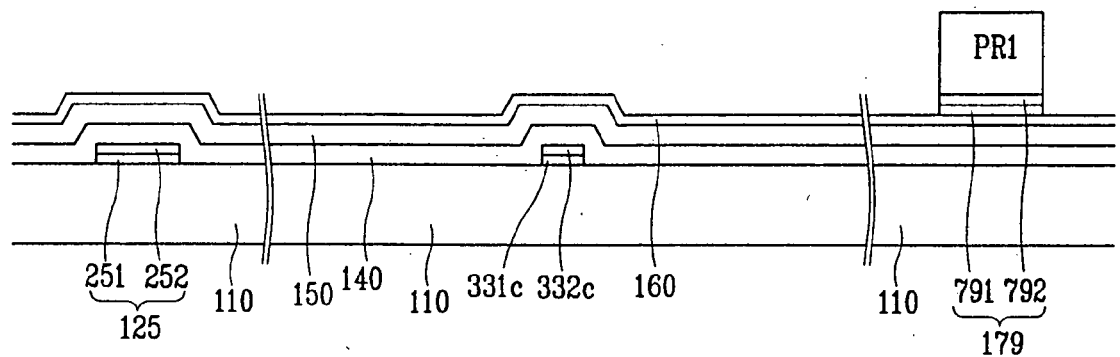
Figure 15B:
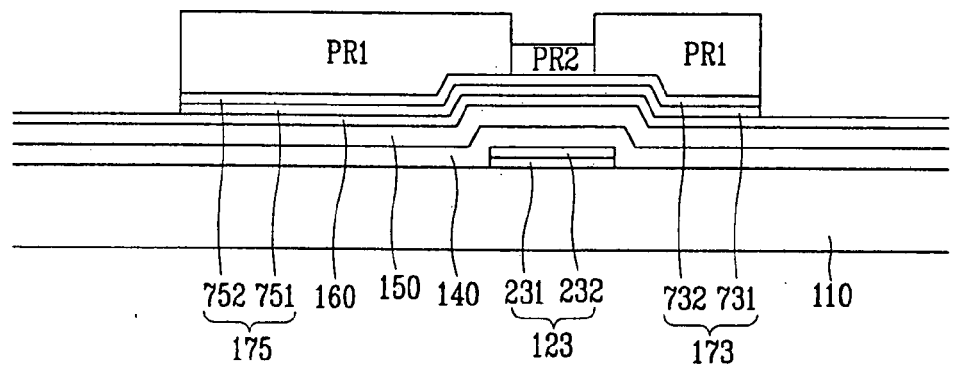

As shown in FIGS. 15A and 15B, the exposed portions of the conductive layer 170 on the areas B are removed to expose the underlying portions of the contact layer 150. In this step, both dry etching and wet etching is selectively used and preferably performed under the condition that the conductive layer 170 is selectively etched while the photoresist pattern PR1 and PR2 is hardly etched. However, an etching condition capable of etching the photoresist pattern PR1 and PR2 as well as the conductive layer 170 would be suitable for dry etching since it is difficult to find a condition for selectively etching only the conductive layer 170 while not etching the photoresist pattern PR1 and PR2. In this case, the second portion PR2 should have relatively thick compared with that for wet etching in order to prevent the exposure of the underlying conductive layer 170 through the etching.

Consequently, as shown in FIGS. 15A and 15B, portions 171, 173, 175 and 179 of the conductive layer on the channel areas C and the data areas A, and under-bridge metal pattern 172 are left over, while portions of the conductive layer 170 on the remaining areas B is removed out to expose the underlying portions of the contact layer 150. The remaining conductor patterns 171, 173, 175 and 179 have substantially the same shapes as the data wire 171, 173, 175 and 179 except that the source and the drain electrodes 173 and 175 are still connected without separation. When using the dry etching, the photoresist pattern PR1 and PR2 are also etched to a predetermined thickness.

Figure 16A:
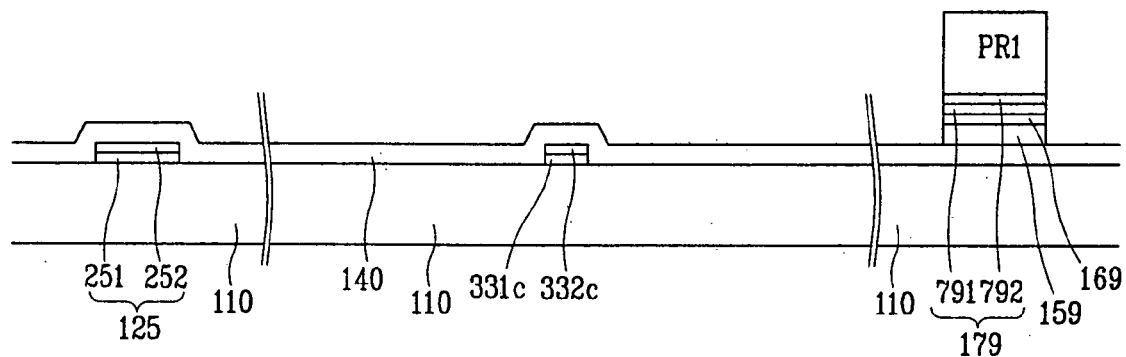
Figure 16B:
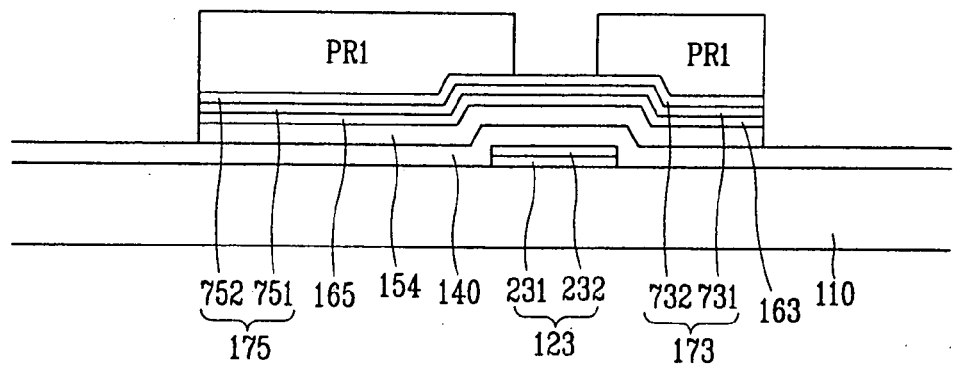

Next, as shown in FIGS. 16A and 16B, the exposed portions of the contact layer 150 on the areas B and the underlying portions of the amorphous silicon layer 150 are simultaneously removed by dry etching together with the second photoresist portions PR2. The etch is preferably made in a condition that the photoresist pattern PR1 and PR2, the contact layer 150 and the amorphous silicon layer 150 are simultaneously etched while the gate insulating layer 140 is not etched. (It is noted that the amorphous silicon layer and the intermediate layer have no etching selectivity.) Particularly, the etching ratios of the photoresist pattern PR1 and PR2 and the amorphous silicon layer 150 are preferably equal to each other. For example, the film and the layer are etched to substantially the same thickness using a gas mixture of $SF_6$ and HCl or a gas mixture of $SF_6$ and $O_2$. For the equal etching ratios of the photoresist pattern PR1 and PR2 and the amorphous silicon layer 150, the thickness of the second portions PR2 is preferably equal to or less than the sum of the thicknesses of the amorphous silicon layer 150 and the contact layer 150.

In this way, as shown in FIGS. 16A and 16B, the second portions PR2 on the channel areas C are removed to expose the source/drain conductor pattern 173 and 175, and the portions of the contact layer 150 and the amorphous silicon layer 150 on the areas B are removed to expose the underlying portions of the gate insulating layer 140. Meanwhile, the first portions PR1 on the data areas A are also etched to have reduced thickness. In this step, the formation of a amorphous silicon pattern 151, 153 and 157 are completed. A contact layer 161, 163 and 165 and 169 is formed on the amorphous silicon pattern 151, 153 and 157.

Residual photoresist remained on the surface of the source/drain conductor pattern 173 and 175 on the channel areas C is then removed by ashing.

Figure 17A:
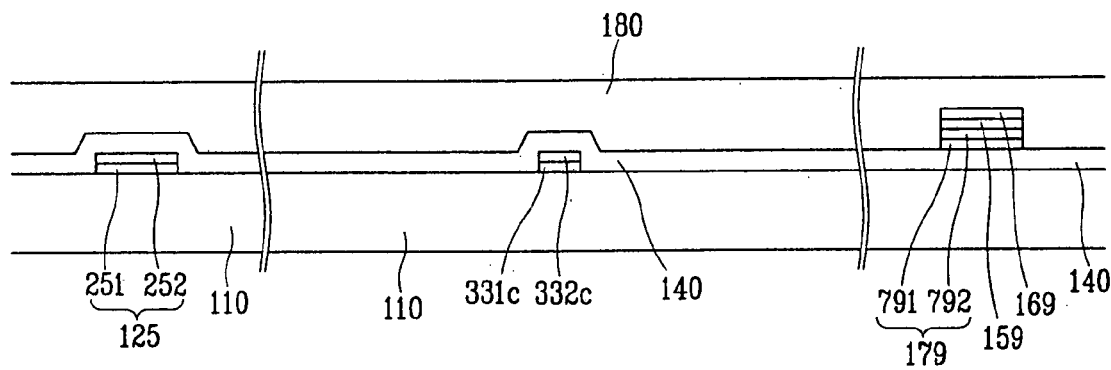
Figure 17B:
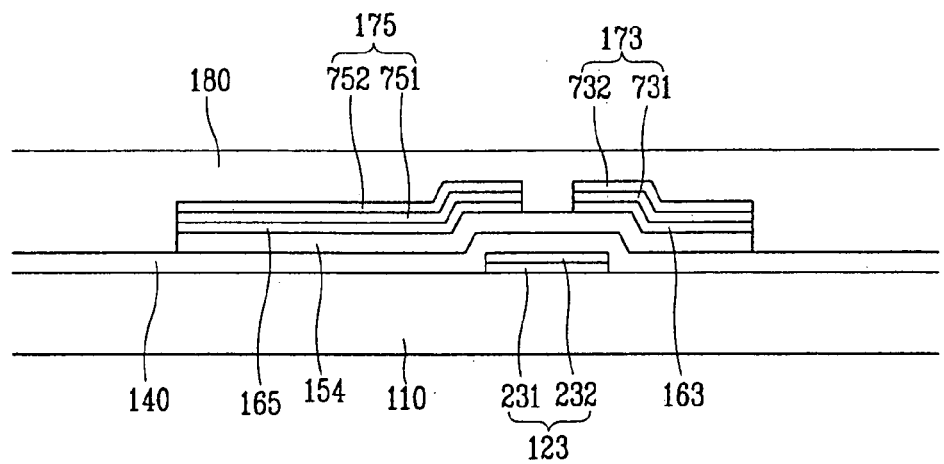

Subsequently, as shown in FIGS. 17A and 17B, the exposed portions of the source/drain conductor pattern on the channel areas C and the underlying portions of the source/drain contact layer pattern are etched to be removed. Dry etching may be applied to both of the source/drain conductor pattern and the source/drain contact layer pattern. Alternatively, wet etching is applied to the source/drain conductor pattern while dry etching is applied to the source/drain contact layer pattern. In the former case, it is preferable that the conductor pattern and the contact layer pattern are etched under large etching selectivity because, if not large, it is not easy to find the end point of etching and in turn, it is not easy to adjust the thickness of the amorphous silicon pattern left on the channel areas C. In the latter case alternately performing dry etch and wet etch, the lateral sides of the source/drain conductor pattern subject to wet etch are etched, while those of the contact layer pattern subject to dry etch are hardly etched, thereby obtaining the stepwise lateral sides. Examples of etching gases used for etching the conductor pattern and the contact layer 163 and 165 are a gas mixture of $CF_4$ and HCl and a gas mixture of $CF_4$ and $O_2$. The gas mixture of $CF_4$ and $O_2$ leaves the amorphous silicon pattern 154 with even thickness. At this time, top portions of the amorphous silicon pattern may be removed to cause thickness reduction, and the first portions PR1 of the photoresist pattern is etched to a predetermined thickness. The etching is performed under the condition that the gate insulating layer 140 is hardly etched, and it is preferable that the photoresist film is so thick to prevent the first portion PR1 from being etched to expose the underlying data wire 171, 173, 175 and 179 and the underlying storage capacitor electrodes 177.

In this way, the source and the drain electrodes 173 and 175 are separated from each other while completing the formation of the data wire 171, 173, 175 and 179 and the underlying contact layer pattern 161, 163 and 165.

Finally, the first portions PR1 remained on the data areas A are removed. However, the removal of the first portions PR1 may be made between the removal of the portions of the source/drain conductor pattern 173 and 175 on the channel areas C and the removal of the underlying portions of the contact layer pattern 163 and 165.

As described above, dry etch and wet etch are alternately performed or only dry etch is used. Although the latter process using only one type of etch is relatively simple, it is hard to find appropriate etching conditions. On the contrary, the former process enables to find proper etching conditions while it is rather complicated.

Next, as shown in FIGS. 17A and 17B, a passivation layer 180 is formed by growing a a-Si:C:O film or a a-Si:O:F film by chemical vapor deposition ("CVD"), by depositing an inorganic insulating film such as SiNx, or by coating an organic insulating film such as acryl-based material. The deposition of the a-Si:C:O film is performed by using $SiH(CH_3)_3$, $SiO_2(CH_3)_4$, $(SiH)_4O_4(CH_3)_4$, $Si(C_2H_5O)_4$, etc., in gaseous states as a basic source, and flowing a gas mixture of an oxidizer such as $N_2O$ and $O_2$ and Ar or He. The deposition of the a-Si:O:F film is performed in the flow of a gas mixture of $O_2$ and $SiH_4$, $SiF_4$, etc. $CF_4$ may be added as an auxiliary source of fluorine.

Figure 18A:
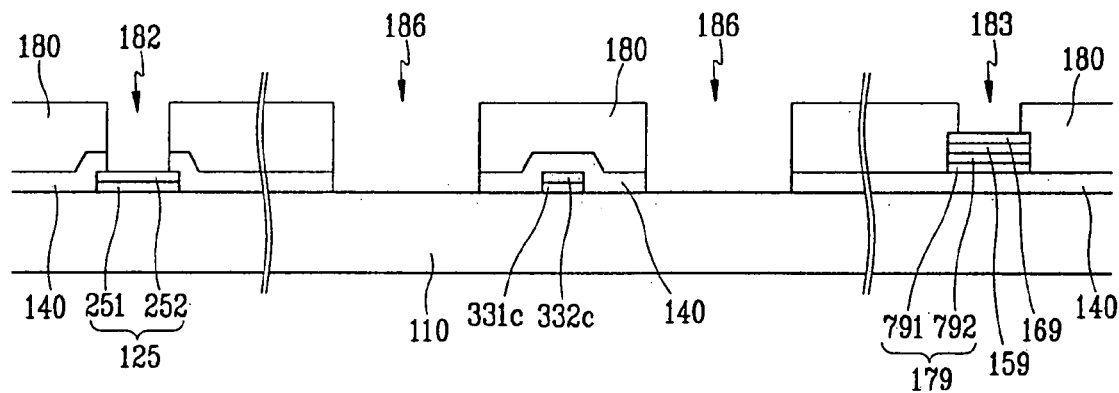
Figure 18B:
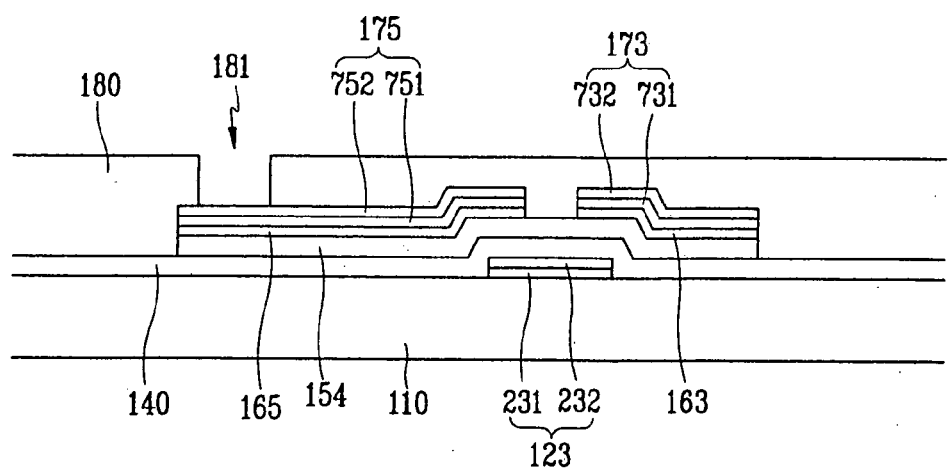

Subsequently, as shown in FIGS. 18A and 18B, the passivation layer 180 is photo-etched together with the gate insulating layer 140 to form a plurality of contact holes 181, 182, 183 and 184 exposing the drain electrodes 175, the gate pads 125 and the data pads 179 and the storage capacitor electrodes 177 and filmless areas 186 exposing the panel 110. It is preferable that the area of each of the contact holes 181 and 183 exposing the pads 125 and 179 is equal to or larger than 0.5 mm×15 μm and equal to or less than 2 mm×60 μm. Although not shown, a plurality of contact holes for contacting storage bridges with the storage electrode lines and the storage electrodes are also formed in this step (A Third Mask).

Figure 11A:
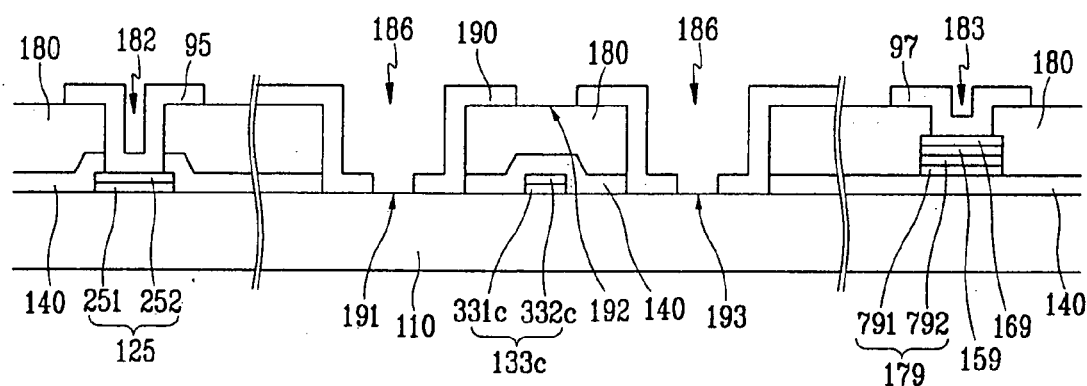
FIG. 11A is a sectional view of the LCD shown in FIG. 3 taken along the lines XIa–XIa', XIa'–XIa" and XIa"–XIa'"
Figure 11B:
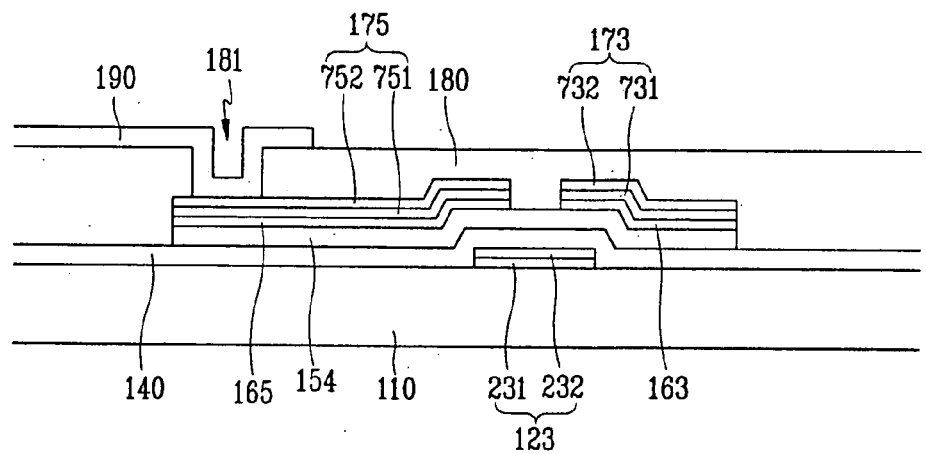
FIG. 11B is a sectional view of the LCD shown in FIG. 3 taken along the line XIb–XIb'.

Finally, as shown in FIGS. 11A and 11B, an ITO layer or an IZO layer is deposited and photo-etched to a plurality of pixel electrodes 190, a plurality of auxiliary gate pads 95 and a plurality of auxiliary data pads 97. Each pixel electrode 190 is connected to the drain electrode 175 and the storage capacitor electrode 177, and each of the auxiliary gate pad 95 and the auxiliary data pad 97 are connected to the gate pad 95 and the data pad 97. Although not shown, a plurality of storage bridges is also formed in this step (A Fourth Mask).

Since the pixel electrodes 190, the auxiliary gate pads 95 and the auxiliary data pads 97 made of IZO is formed by using a Cr etchant, it is possible to prevent the corrosion of the exposed portions of the data wire or the gate wire through the contact holes during the photo etching step for forming the pixel electrodes 190, the auxiliary gate pads 95 and the auxiliary data pads 97. An example of such etchant is $HNO_3/(NH_4)_2Ce(NO_3)_6/H_2O$. Deposition of IZO in a temperature range between a room temperature and about 200° C. is preferred for minimizing the contact resistance at the contacts. It is preferable that a target used for forming an IZO film includes $In_2O_3$ and ZnO and an amount of ZnO contained therein is in a range of 15–29 at %.

A pre-heating process using nitrogen gas is preferably performed before depositing ITO or IZO. This is required for preventing the formation of metal oxides on the exposed portions of the metal layers through the contact holes 181, 182, 183, 184 and 185.

Although cutouts are exemplified as members for partitioning small domains in the above description, dielectric protrusions are also used as the domain partitioning members. The protrusions are provided on pixel electrodes and a common electrode as the domain partitioning members.

Figure 19:
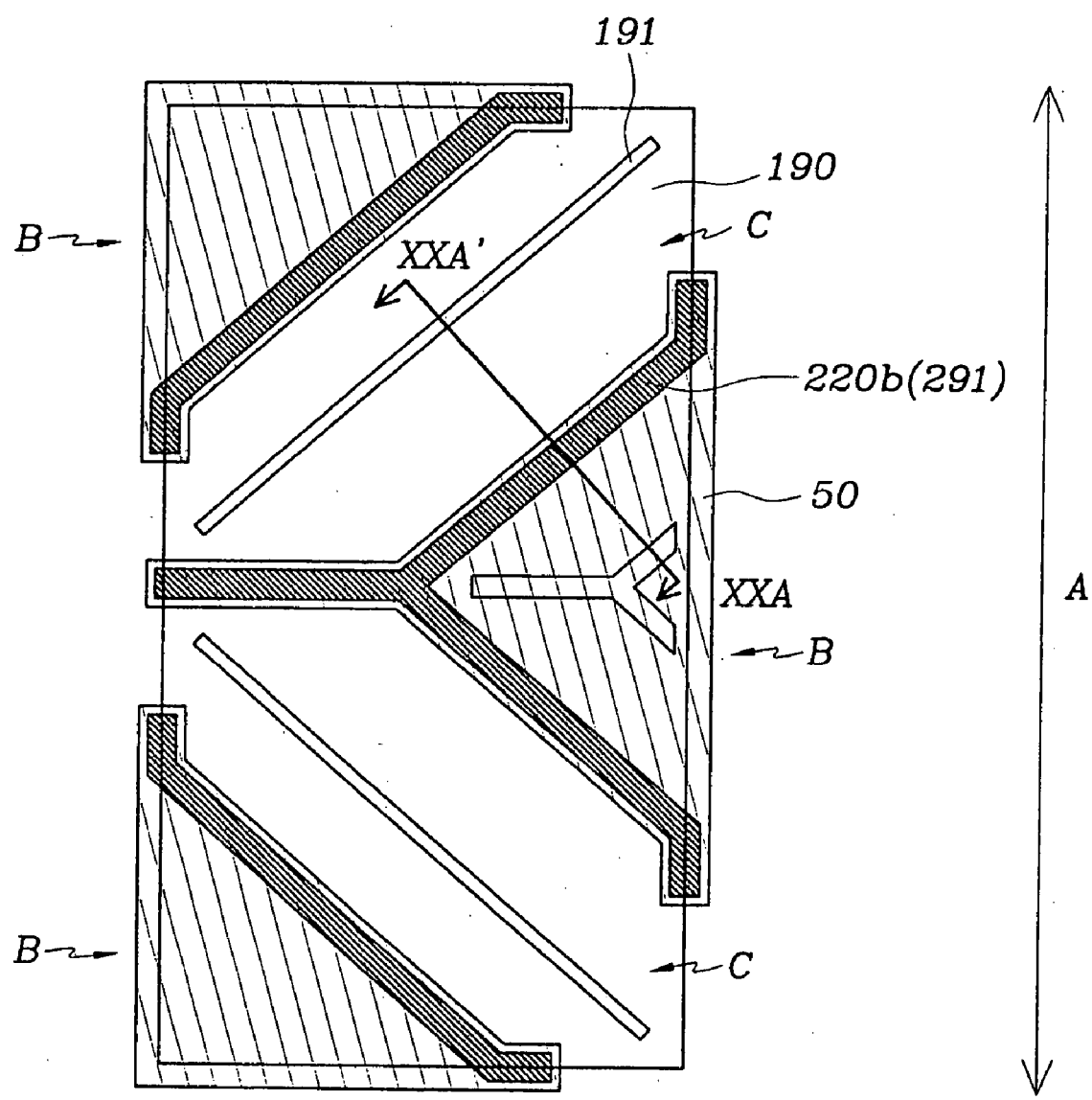
FIG. 19 is a schematic layout view of an LCD according to a third embodiment of the present invention.
Figure 20A:
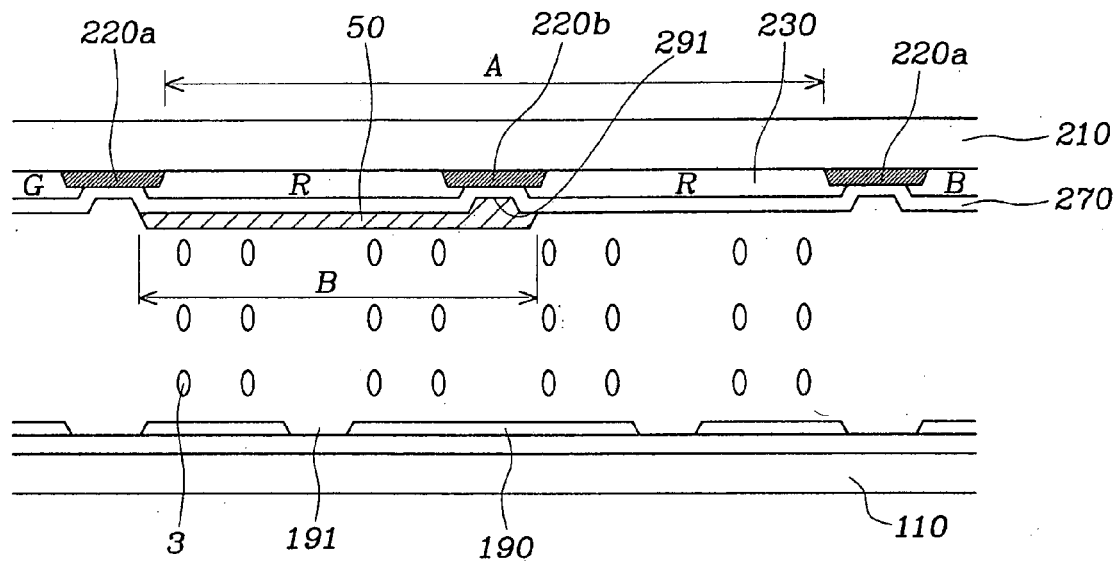
FIGS. 20A and 20B are sectional views of the LCD according to the third embodiment of the present invention shown in FIG. 19 taken along the line XXA–XXA', which show the arrangements of the liquid crystal molecules in an normally black mode LCD in the absence of electric field and in the application of voltages, respectively.
Figure 20B:
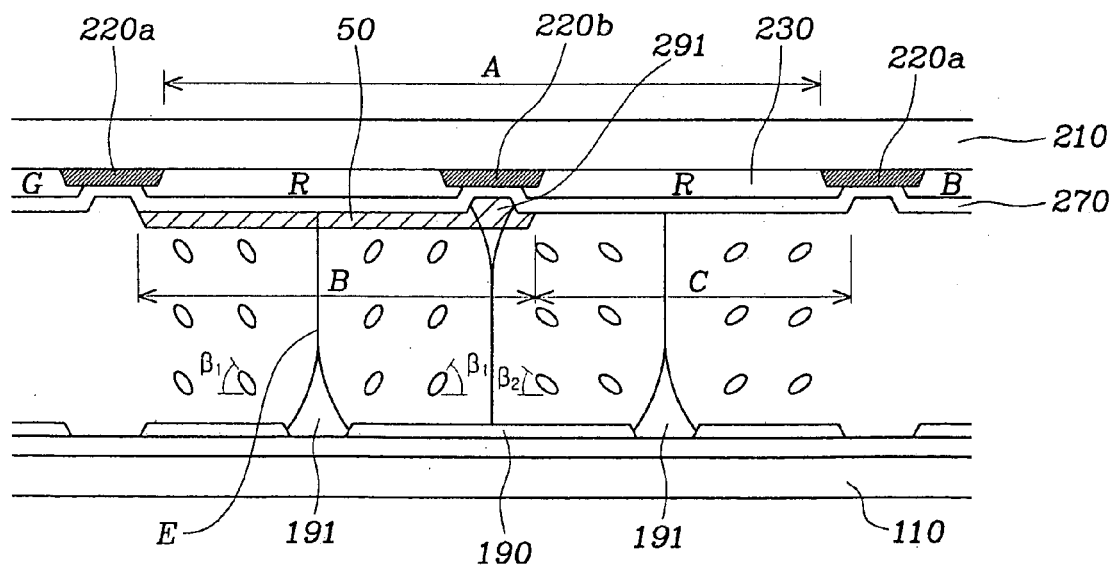

FIG. 19 is a schematic layout view of an LCD according to a third embodiment of the present invention, and FIGS. 20A and 20B are sectional views of the LCD according to the third embodiment of the present invention shown in FIG. 19 taken along the line XXA–XXA'. FIGS. 20A and 20B show the arrangements of the liquid crystal molecules in an normally black mode LCD in the absence of electric field and in the application of voltages, respectively.

As shown in FIGS. 20A and 20B, a transparent pixel electrode 190 preferably made of a transparent conductive material such as ITO and IZO is formed on a surface of a first substrate 110. The pixel electrode 190 has a plurality of cutouts 191 formed by removing portions of the pixel electrode. A second substrate 210 faces the first substrate 110 and space apart from the first substrate 110.

An outer black matrix 220a and an inner black matrix 220b are formed on the inner surface of the second substrate. The outer black matrix 220b has a matrix shape to define pixel areas A, and the inner black matrix 220b is located within the pixel area A and has a predetermined shape.

A plurality of red, green and blue color filters are formed on the outer and inner black matrices 220a and 220b. The portions of the color filter 230 overlapping the inner black matrix 220b are removed to expose the inner matrix 220b. The portions of the outer black matrix 220a located at the boundary between the colors are exposed without covered by the color filter 230. Some portions of the color filters 230 overlap and contact the outer and inner black matrices 220a and 220b while remaining portions are in direct contact with the second substrate 210.

A transparent common electrode 270 is formed on the inner surfaces of the exposed portions of the outer and inner matrices 220a and 220b and the color filters 230. The common electrode 270 is depressed to form recesses on the inner matrix 220b. An organic insulating layer 50 is formed on the common electrode 270 and located in a predetermined area. As shown in FIGS. 20A and 20B, the organic insulating layer 50 is disposed in a predetermined area B in a pixel area A surrounded by the outer black matrix 220a. The organic insulating layer 50 covers the recesses 291 provided on the inner black matrix 220b.

A plurality of liquid crystal molecules 3 with negative dielectric are interposed between the first substrate 110 and the second substrate 210.

As shown in FIG. 20A, the liquid crystal molecules 3 is aligned perpendicular to the surface of the two substrates 110 and 210 when there is no voltage between the pixel electrode 190 and the common electrode 270.

As shown in FIG. 20B, an electric filed E is generated between the first and the second substrates 110 and 210 when voltages are applied to the pixel electrode 190 and the common electrode 270. The electric field form a fringe field of an inclined curve without exact perpendicularity with respect to the two substrates 110 and 210 due to the recesses 291 of the common electrode 270 located at the overlaps between the cutouts 191 of the pixel electrode 190 and the inner black matrix 220b. Since the liquid crystal molecules 3 with negative dielectric anisotropy tend to align perpendicular to the field direction, they re-arrange such that their major axes are oblique to the surfaces of the two substrates 110 and 210. Accordingly, the liquid crystal molecules 3 in the opposite regions with respect to the cutouts 191 and the recesses 291 tilt in an opposite manner, and this compensates for the optical characteristics of the opposite regions to widen the viewing angle.

In the meantime, it is assumed that $\beta1$ is a tilt angle of the major axis of a liquid crystal molecule 3 with respect to the first substrate 110 in a region B with the organic insulating layer 50 and $\beta2$ is a tilt angle of the major axis of a liquid crystal molecule 3 with respect to the first substrate 110 in a region C without the organic insulating layer 50. The tilt angles $\beta1$ and $\beta2$ in the regions B and C are different.

This will be described in detail.

The strength of the electric field for equal voltage is different in the region B with the organic insulating layer 50 and the region C without the organic insulating layer 50. For example, the strength of the electric field for equal voltages in the region C without the organic insulating layer 50 is larger than in the region B with the organic insulating layer 50. It is because the voltage is divided by the organic insulating layer 50 such that the voltage across the liquid crystal in the region B with the organic insulating layer 50 is reduced compared with that in the region C without the organic insulating layer 50. Accordingly, the liquid crystal molecules in the region B with the organic insulating layer 50 experiences relatively weak electric field to make relatively small tilt angle while those in the region C without the organic insulating layer 50 experiences relatively strong electric field to make relatively large tilt angle. Therefore, tilt angle $\beta1$ of the major axes of the liquid crystal molecules in the region B with the organic insulating layer 50 is large relative to the tilt angle β2 in the region C without the organic insulating layer 50.

Figure 21:
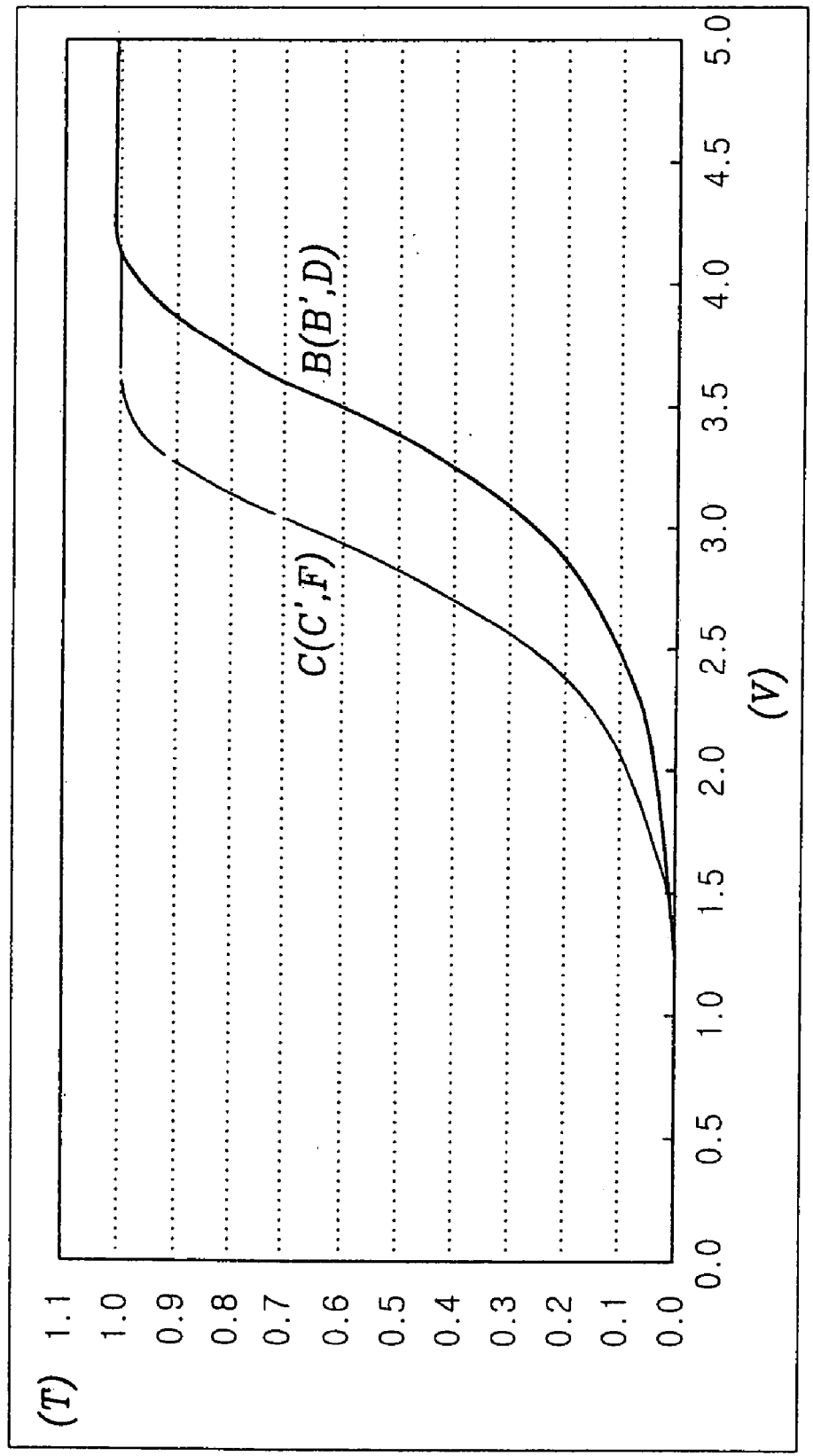
FIG. 21 is a graph of the transmittance as function of applied voltage.

Since the tilt angles between the regions B with the organic insulating layer 50 and the regions C without the organic insulating layer 50 are different, the transmittance curves as function of applied voltage, i.e., the V-T curves are different as shown in FIG. 21. Accordingly, the optical characteristics in the two regions B and C are effectively compensated to widen the viewing angle. It is preferable that the dielectric constant of the organic insulating layer 50 ranges 1.5 to 7.5 and the thickness thereof is equal to or less than 3.0 microns. It is because the transmittance becomes poor when the thickness of organic insulating layer 50 becomes larger than 3.0 microns.

Although the figures show that the organic insulating layer covers one of the two regions, the organic insulating layer 50 may cover at least one domain among a plurality of domains forming a pixel region. That is, the patterns of the organic insulating layer 50 are not limited to the embodiments of the present invention but can have various shapes and arrangements for four domain pixels.

FIG. 19 shows a simple layout of an LCD according to an embodiment of the present invention.

As shown in FIG. 19, the pixel cutouts 191 and the recesses 291 of the common electrode 270 are alternately arranged. In this case, since the recesses 291 of the common electrode 270 and the inner black matrix 220b overlap each other, they are not distinguished in FIG. 19. A pixel region A is divided into the regions B with the organic insulating layer 50 and the regions C without the organic insulating layer 50. Each region B and C are partitioned by a plurality of domains. The optical characteristics of the domains are compensated to widen the viewing angle.

Now, a method of manufacturing an LCD according to the third embodiment of the present invention is described in detail with reference to FIGS. 22A to 22D.

FIGS. 22A to 22D are sectional views sequentially illustrating a color filter panel for an LCD according to a third embodiment of the present invention.

An LCD includes a color filter panel provided with a common electrode, a TFT array panel provided with a plurality of pixel electrodes, and a liquid crystal layer interposed therebetween.

The method of manufacturing a color filter panel 200 includes the steps of forming inner and outer matrices and color filters, forming a common electrode, forming an organic insulating layer and patterning the organic insulating layer.

Figure 22A:
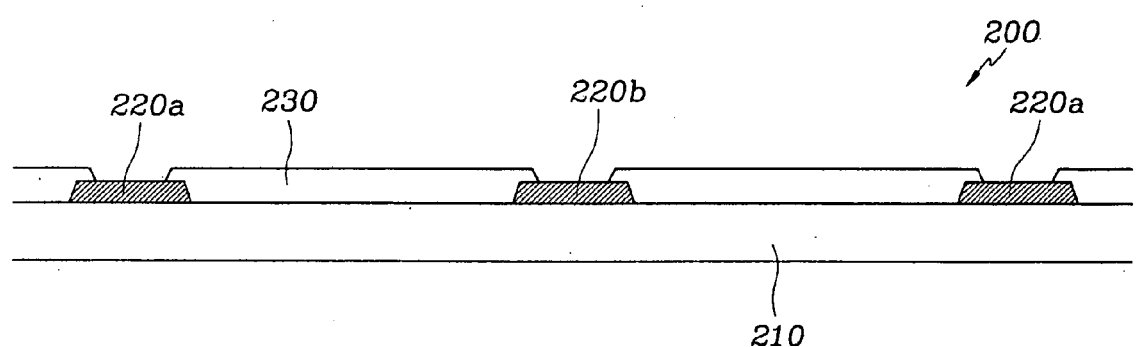
FIGS. 22A to 22D are sectional views of a color filter panel for an LCD sequentially showing the steps of a manufacturing method thereof according to the third embodiment of the present invention.

As shown in FIG. 22A, the step of forming inner and outer matrices and color filters includes the formation of a net-shaped outer matrix for covering boundaries of the pixel areas and an inner black matrix located in the pixel area. The coating of photosensitive material containing pigments on the black matrices 220a and 220b and performing light exposure and development are repeated three times to for red, green and blue color filters 230. At this time, portions of the color filters 230 on the inner black matrix 220b in the pixel areas are removed to expose portions of the inner black matrix 220b.

Figure 22B:
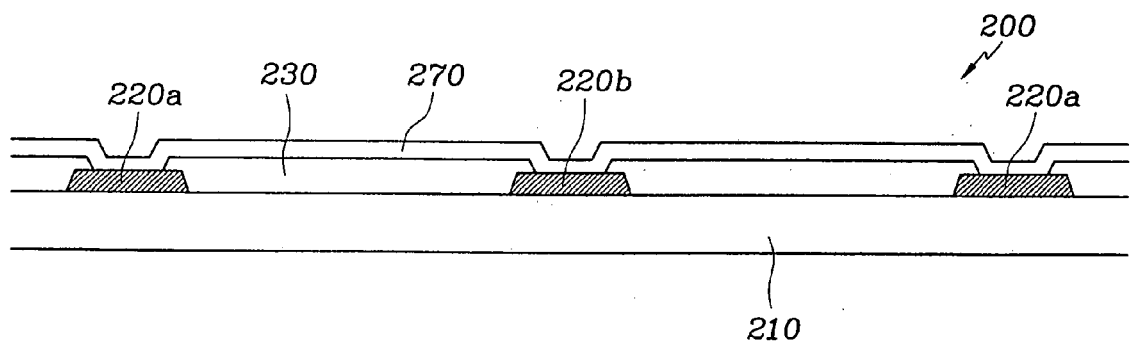

As shown in FIG. 22B, the step of forming a common electrode includes the deposition of an ITO layer or an IZO layer on the exposed portions of the inner and outer black matrices 220a and 220b and the color filters 230 to form the common electrode 270. The portions of the common electrode 270 on the inner black matrix form recesses 291.

Figure 22C:
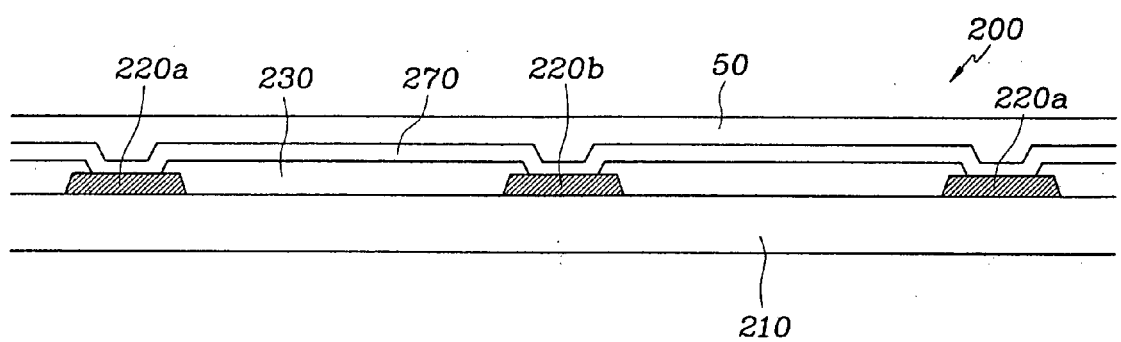

Subsequently, as shown in FIG. 22C, an organic insulating layer 50 covering the common electrode 270 is formed.

Figure 22D:
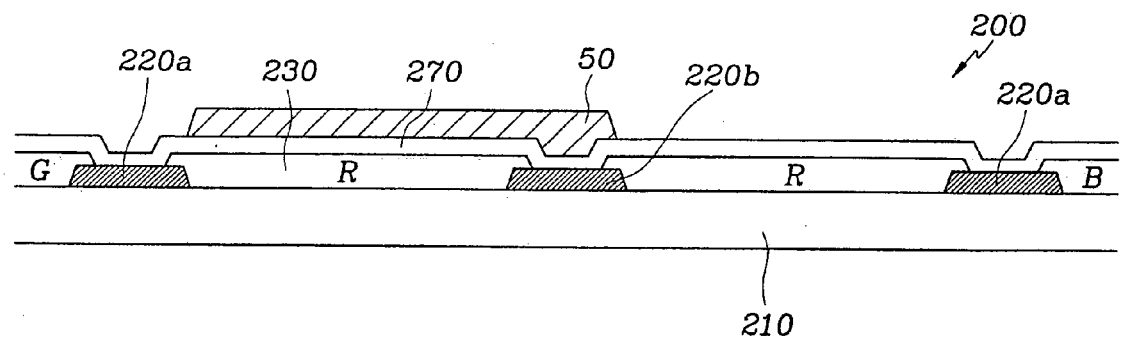

Next, as shown in FIG. 22D, the patterning of the organic insulating layer 50 leaves only the portions of the organic insulating layer 50 in some regions of a pixel region.

According to the method of manufacturing a color filter panel, the common electrode 270 on the second substrate has no cutout. Therefore, a photo-etch process for forming the cutouts is not required, and thus the formation of a buffer overcoat for protecting the color filters from etchant is not required, too. This simplifies the method and solves the problem of resistance increase of the common electrode 270 due to the cutouts. In addition, the defects resulted from the overcut or undercut of the cutouts are removed.

Figure 23:
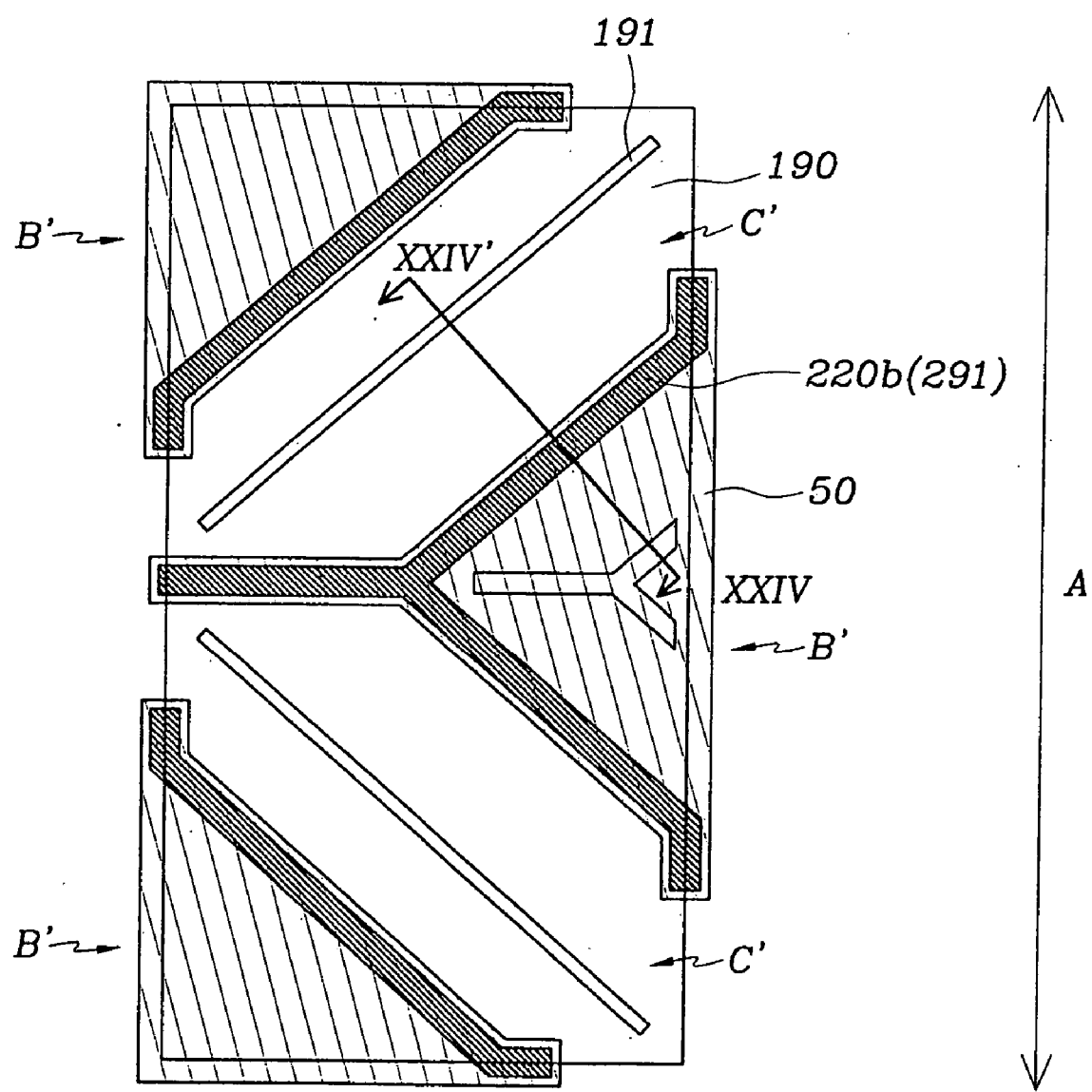
FIG. 23 is a schematic layout view of an LCD according to a fourth embodiment of the present invention.

FIG. 23 is a schematic layout view of an LCD according to a fourth embodiment of the present invention, and FIGS. 24A and 24B are sectional views of the LCD according to the fourth embodiment of the present invention shown in FIG. 23 taken along the line XXIV–XXIV'. FIGS. 24A and 24B show the arrangements of the liquid crystal molecules in an normally black mode LCD in the absence of electric field and in the application of voltages, respectively.

Here, like numerals as in the above-reference figures refer to like elements performing like function.

As shown in FIGS. 24A and 24B, a transparent pixel electrode 190 preferably made of a transparent conductive material such as ITO and IZO is formed on a surface of a first substrate 110. The pixel electrode 190 has a plurality of cutouts 191 formed by removing portions of the pixel electrode. A second substrate 210 faces the first substrate 110 and space apart from the first substrate 110.

An outer black matrix 220a and an inner black matrix 220b are formed on the inner surface of the second substrate. The outer black matrix 220b has a matrix shape to define pixel areas A, and the inner black matrix 220b is located within the pixel area A and has a predetermined shape.

A plurality of red, green and blue color filters are formed on the outer and inner black matrices 220a and 220b. The color filter 230 covers the inner black matrix 220b. The portions of the outer black matrix 220a located at the boundary between the colors are exposed without covered by the color filter 230. Some portions of the color filters 230 overlap and contact the outer black matrices 220a and 220b while remaining portions are in direct contact with the second substrate 210.

An overcoat 250 for protecting the color filters 230 is formed on the inner surfaces of the color filters 230. A transparent common electrode 270 is formed on the inner surfaces of the overcoat 250. The common electrode 270 has a plurality of cutouts 271. The first and the second substrates 110 and 210 are aligned such that the cutouts 271 and 291 are arranged alternately without matching each other.

An organic insulating layer 50 is formed on the common electrode 270 and located in a predetermined area. As shown in FIGS. 24A and 24B, the organic insulating layer 50 is disposed in a predetermined area B' in a pixel area A surrounded by the outer black matrix 220a and divides the pixel area A into two areas. The organic insulating layer 50 does not cover the cutouts 271 of the common electrode 270.

A plurality of liquid crystal molecules 3 with negative dielectric are interposed between the first substrate 110 and the second substrate 210.

As shown in FIG. 24A, the liquid crystal molecules 3 is aligned perpendicular to the surface of the two substrates 110 and 210 when there is no voltage between the pixel electrode 190 and the common electrode 270.

As shown in FIG. 24B, an electric filed E is generated between the first and the second substrates 110 and 210 when voltages are applied to the pixel electrode 190 and the common electrode 270. The electric field form a fringe field of an inclined curve without exact perpendicularity with respect to the two substrates 110 and 210 due to the cutouts 291 of the common electrode 270 and the cutouts 191 of the pixel electrode 190. Since the liquid crystal molecules 3 with negative dielectric anisotropy tend to align perpendicular to the field direction, they re-arrange such that their major axes are oblique to the surfaces of the two substrates 110 and 210. Accordingly, the liquid crystal molecules 3 in the opposite regions with respect to the cutouts 191 and 271 tilt in an opposite manner, and this compensates for the optical characteristics of the opposite regions to widen the viewing angle.

In the meantime, it is assumed that $\beta1$ is a tilt angle of the major axis of a liquid crystal molecule 3 with respect to the first substrate 110 in a region B' with the organic insulating layer 50 and $\beta2$ is a tilt angle of the major axis of a liquid crystal molecule 3 with respect to the first substrate 110 in a region C' without the organic insulating layer 50. The tilt angles $\beta1$ and $\beta2$ in the regions B' and C' are different.

This will be described in detail.

The strength of the electric field for equal voltage is different in the region B' with the organic insulating layer 50 and the region C' without the organic insulating layer 50. For example, the strength of the electric field for equal voltages in the region C' without the organic insulating layer 50 is larger than in the region B' with the organic insulating layer 50. It is because the voltage is divided by the organic insulating layer 50 such that the voltage across the liquid crystal in the region B' with the organic insulating layer 50 is reduced compared with that in the region C' without the organic insulating layer 50. Accordingly, the liquid crystal molecules in the region B with the organic insulating layer 50 experiences relatively weak electric field to make relatively small tilt angle while those in the region C' without the organic insulating layer 50 experiences relatively strong electric field to make relatively large tilt angle. Therefore, tilt angle $\beta1$ of the major axes of the liquid crystal molecules in the region B' with the organic insulating layer 50 is large relative to the tilt angle $\beta2$ in the region C' without the organic insulating layer 50.

Since the tilt angles between the regions B' with the organic insulating layer 50 and the regions C' without the organic insulating layer 50 are different, the transmittance curves as function of applied voltage, i.e., the V-T curves are different as shown in FIG. 21. Accordingly, the optical characteristics in the two regions B and C are effectively compensated to widen the viewing angle. It is preferable that the dielectric constant of the organic insulating layer 50 ranges 1.5 to 7.5 and the thickness thereof is equal to or less than 3.0 microns. It is because the transmittance becomes poor when the thickness of organic insulating layer 50 becomes larger than 3.0 microns.

As shown in FIG. 23, the pixel cutouts 191 and 271 of the common electrode 270 are alternately arranged. In this case, since the recesses 291 of the common electrode 270 and the inner black matrix 220b overlap each other, they are not distinguished in FIG. 23. A pixel region A is divided into the regions B' with the organic insulating layer 50 and the regions C' without the organic insulating layer 50. Each region B' and C' are partitioned by a plurality of domains. The optical characteristics of the domains are compensated to widen the viewing angle.

Now, a method of manufacturing an LCD according to the third embodiment of the present invention is described in detail with reference to FIGS. 25A to 25E.

FIGS. 25A to 25E are sectional views sequentially illustrating a color filter panel for an LCD according to a fourth embodiment of the present invention.

An LCD includes a color filter panel provided with a common electrode, a TFT array panel provided with a plurality of pixel electrodes, and a liquid crystal layer interposed therebetween.

The method of manufacturing a color filter panel 200 includes the steps of forming inner and outer matrices and color filters, forming an overcoat, forming a common electrode, forming an organic insulating layer and patterning the organic insulating layer.

Figure 25A:
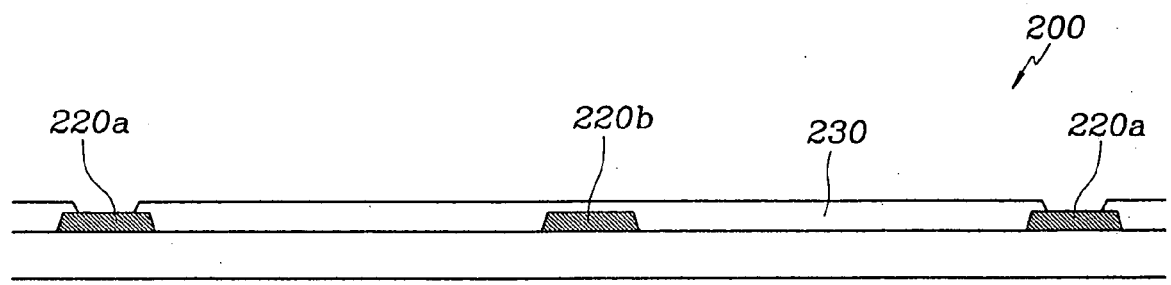
FIGS. 25A to 25E are sectional views of a color filter panel for an LCD sequentially showing the steps of a manufacturing method thereof according to the fourth embodiment of the present invention.

As shown in FIG. 25A, the step of forming inner and outer matrices and color filters includes the formation of a net-shaped outer matrix for covering boundaries of the pixel areas and an inner black matrix located in the pixel area. The coating of photosensitive material containing pigments on the black matrices 220a and 220b and performing light exposure and development are repeated three times to for red, green and blue color filters 230. The color filters 230 covers the inner black matrix 220b.

Figure 25B:
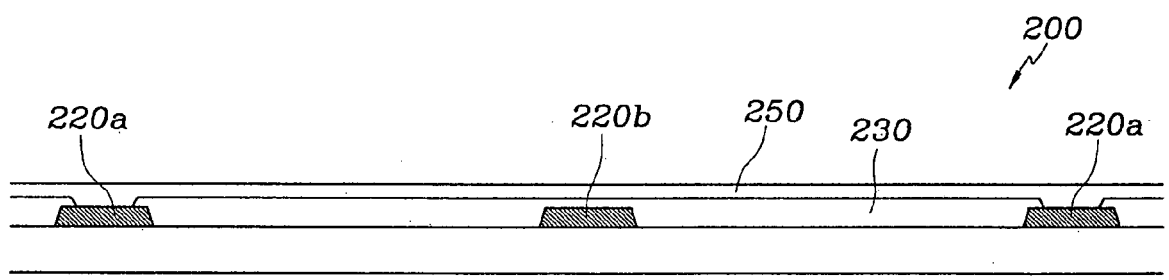

As shown in FIG. 25B, the step of forming an overcoat includes the deposition on the exposed portions of the outer black matrices 220a and 220b and the color filters 230 to form the overcoat 250.

Figure 25C:
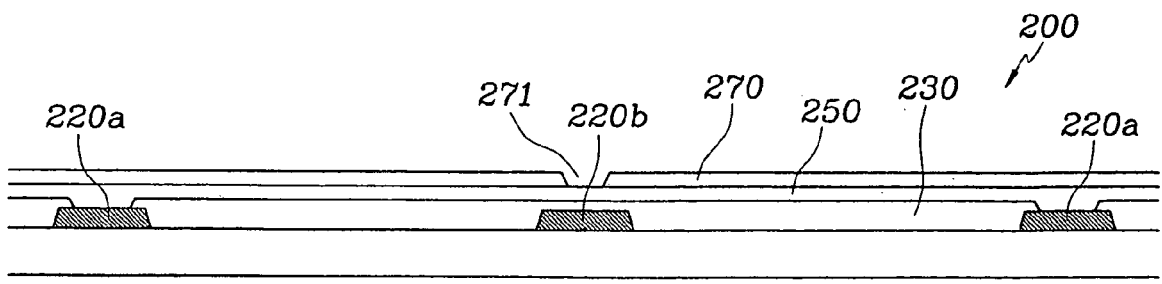

As shown in FIG. 25C, the step of forming a common electrode includes the deposition of the common electrode 270 on the overcoat 250 and the formation of cutouts 271 at the position corresponding to the inner and black matrix 220b.

Figure 25D:
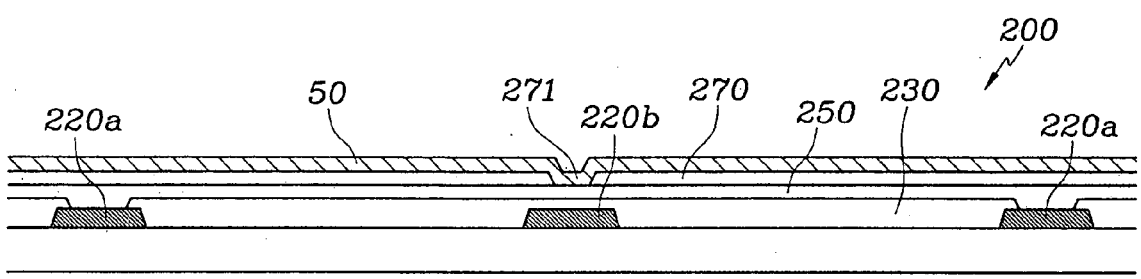

Subsequently, as shown in FIG. 25D, an organic insulating layer 50 covering the common electrode 270 is formed.

Figure 25E:
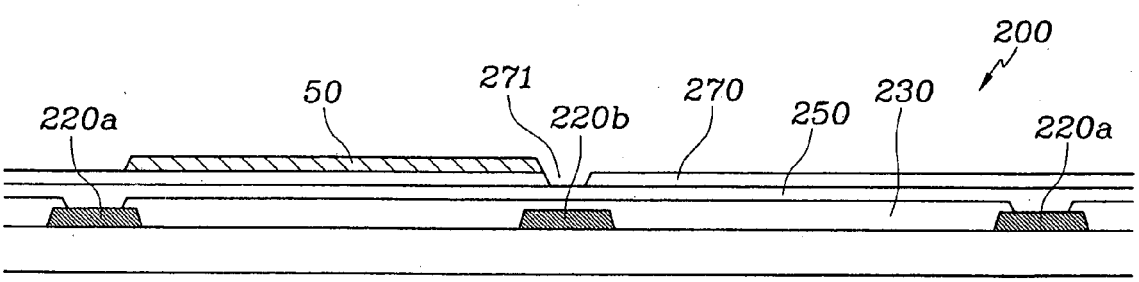

Next, as shown in FIG. 25E, the patterning of the organic insulating layer 50 is performed such that the organic insulating layer 50 does not cover the cutouts 271. Only the portions of the organic insulating layer 50 in some regions of a pixel region is remained.

Figure 26:
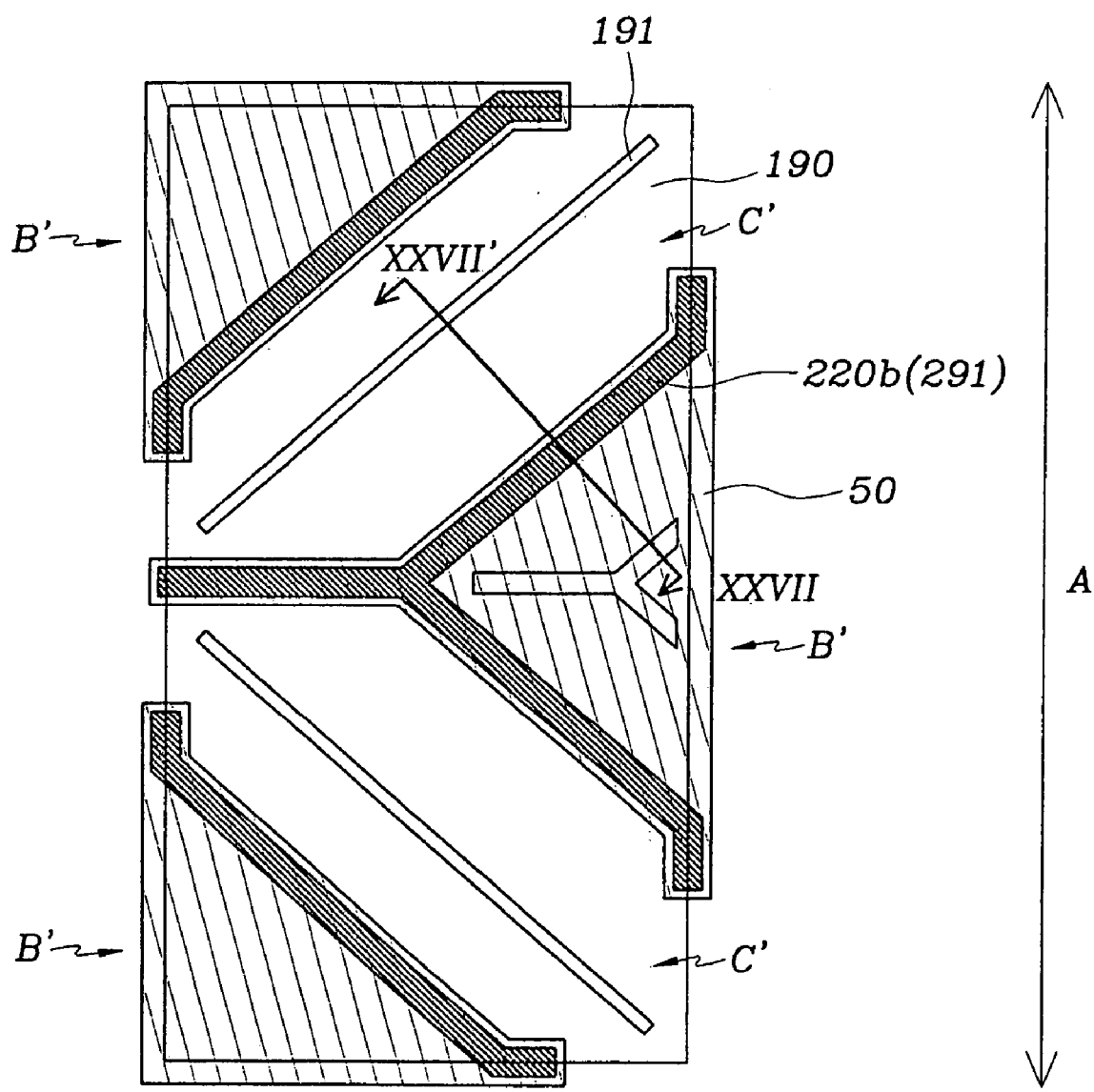
FIG. 26 is a schematic layout view of an LCD according to a fifth embodiment of the present invention.
Figure 27A:
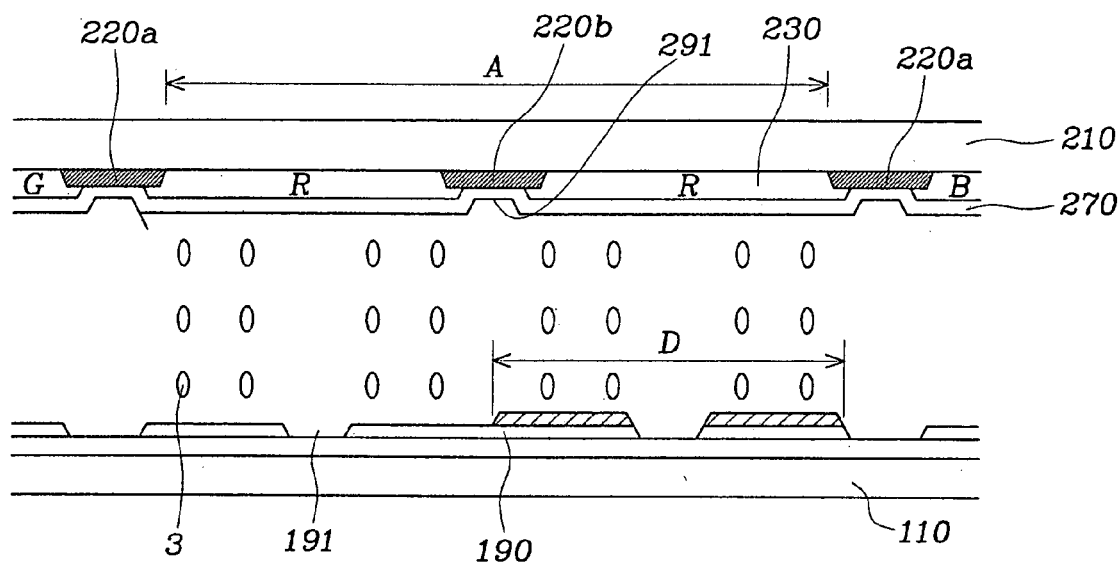
FIGS. 27A and 27B are sectional views of the LCD according to the fifth embodiment of the present invention shown in FIG. 26 taken along the line XXVII–XXVII', which show the arrangements of the liquid crystal molecules in an normally black mode LCD in the absence of electric field and in the application of voltages, respectively.
Figure 27B:
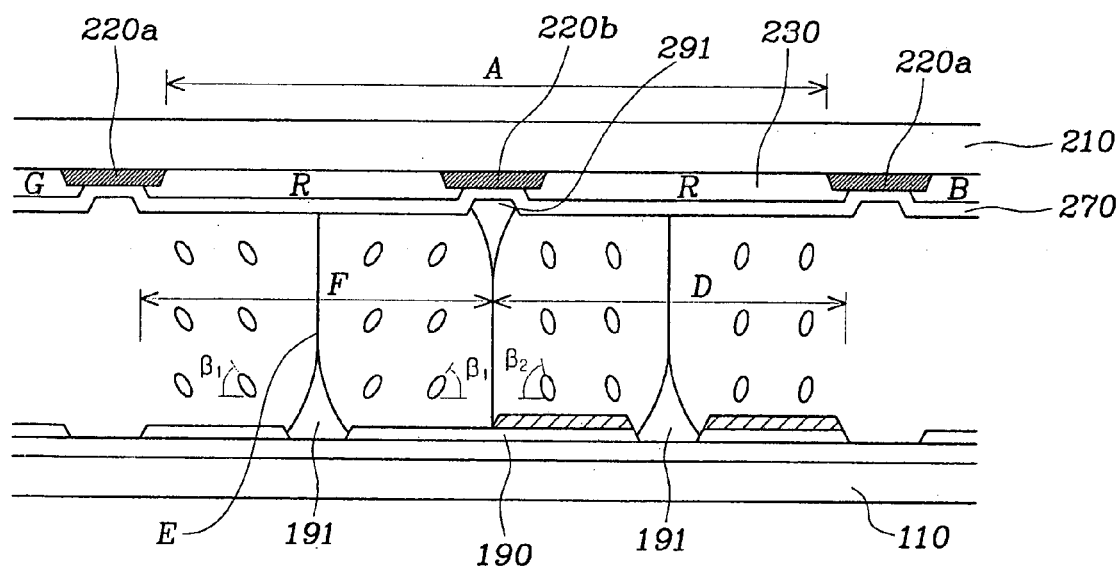

FIG. 26 is a schematic layout view of an LCD according to a fifth embodiment of the present invention, and FIGS. 27A and 27B are sectional views of the LCD according to the fifth embodiment of the present invention shown in FIG. 26 taken along the line XXVII–XXVII'. FIGS. 27A and 27B show the arrangements of the liquid crystal molecules in an normally black mode LCD in the absence of electric field and in the application of voltages, respectively.

As shown in FIGS. 27A and 27B, a transparent pixel electrode 190 preferably made of a transparent conductive material such as ITO and IZO is formed on a surface of a first substrate 110. The pixel electrode 190 has a plurality of cutouts 191 formed by removing portions of the pixel electrode. An organic insulating layer 50 is formed on the pixel electrode 190 and located in a predetermined area. As shown in FIGS. 26, 27A and 27B, the organic insulating layer 50 is disposed in a predetermined area B in a pixel area A surrounded by an outer black matrix 220a. A pixel area A generally represents one of the red, green and blue colors. The organic insulating layer 50 does not cover the cutouts 191 and provided on the pixel electrode 190. A second substrate 210 faces the first substrate 110 and space apart from the first substrate 110.

An outer black matrix 220a and an inner black matrix 220b are formed on the inner surface of the second substrate. The outer black matrix 220b has a matrix shape to define pixel areas A, and the inner black matrix 220b is located within the pixel area A and has a predetermined shape.

A plurality of red, green and blue color filters are formed on the outer and inner black matrices 220a and 220b. The portions of the color filter 230 overlapping the inner black matrix 220b are removed to expose the inner matrix 220b. The portions of the outer black matrix 220a located at the boundary between the colors are exposed without covered by the color filter 230. Some portions of the color filters 230 overlap and contact the outer and inner black matrices 220a and 220b while remaining portions are in direct contact with the second substrate 210.

A transparent common electrode 270 is formed on the inner surfaces of the exposed portions of the outer and inner matrices 220a and 220b and the color filters 230. The common electrode 270 is depressed to form recesses on the inner matrix 220b.

A plurality of liquid crystal molecules 3 with negative dielectric are interposed between the first substrate 110 and the second substrate 210.

As shown in FIG. 27A, the liquid crystal molecules 3 is aligned perpendicular to the surface of the two substrates 110 and 210 when there is no voltage between the pixel electrode 190 and the common electrode 270.

As shown in FIG. 27B, an electric filed E is generated between the first and the second substrates 110 and 210 when voltages are applied to the pixel electrode 190 and the common electrode 270. The electric field form a fringe field of an inclined curve without exact perpendicularity with respect to the two substrates 110 and 210 due to the recesses 291 of the common electrode 270 located at the overlaps between the cutouts 191 of the pixel electrode 190 and the inner black matrix 220b. Since the liquid crystal molecules 3 with negative dielectric anisotropy tend to align perpendicular to the field direction, they re-arrange such that their major axes are oblique to the surfaces of the two substrates 110 and 210. Accordingly, the liquid crystal molecules 3 in the opposite regions with respect to the cutouts 191 and the recesses 291 tilt in an opposite manner, and this compensates for the optical characteristics of the opposite regions to widen the viewing angle.

In the meantime, it is assumed that $\beta 1$ is a tilt angle of the major axis of a liquid crystal molecule 3 with respect to the first substrate 110 in a region D with the organic insulating layer 50 and $\beta 2$ is a tilt angle of the major axis of a liquid crystal molecule 3 with respect to the first substrate 110 in a region F without the organic insulating layer 50. The tilt angles $\beta 1$ and $\beta 2$ in the regions D and F are different.

This will be described in detail.

The strength of the electric field for equal voltage is different in the region D with the organic insulating layer 50 and the region F without the organic insulating layer 50. For example, the strength of the electric field for equal voltages in the region F without the organic insulating layer 50 is larger than in the region D with the organic insulating layer 50. It is because the voltage is divided by the organic insulating layer 50 such that the voltage across the liquid crystal in the region D with the organic insulating layer 50 is reduced compared with that in the region F without the organic insulating layer 50. Accordingly, the liquid crystal molecules in the region D with the organic insulating layer 50 experiences relatively weak electric field to make relatively small tilt angle while those in the region F without the organic insulating layer 50 experiences relatively strong electric field to make relatively large tilt angle. Therefore, tilt angle $\beta 1$ of the major axes of the liquid crystal molecules in the region D with the organic insulating layer 50 is large relative to the tilt angle $\beta 2$ in the region F without the organic insulating layer 50.

Since the tilt angles between the regions D with the organic insulating layer 50 and the regions F without the organic insulating layer 50 are different, the transmittance curves as function of applied voltage, i.e., the V-T curves are different as shown in FIG. 21. Accordingly, the optical characteristics in the two regions D and F are effectively compensated to widen the viewing angle. It is preferable that the dielectric constant of the organic insulating layer 50 ranges 1.5 to 7.5 and the thickness thereof is equal to or less than 3.0 microns. It is because the transmittance becomes poor when the thickness of organic insulating layer 50 becomes larger than 3.0 microns.

Although the figures show that the organic insulating layer covers one of the two regions, the organic insulating layer 50 may cover at least one domain among a plurality of domains forming a pixel region. That is, the patterns of the organic insulating layer 50 are not limited to the embodiments of the present invention but can have various shapes and arrangements for four domain pixels.

FIG. 26 shows a simple layout of an LCD according to an embodiment of the present invention.

As shown in FIG. 26, the pixel cutouts 191 and the recesses 291 of the common electrode 270 are alternately arranged. In this case, since the recesses 291 of the common electrode 270 and the inner black matrix 220b overlap each other, they are not distinguished in FIG. 19. A pixel region A is divided into the regions D with the organic insulating layer 50 and the regions F without the organic insulating layer 50. Each region D and F are partitioned by a plurality of domains. The optical characteristics of the domains are compensated to widen the viewing angle.

Figure 28:
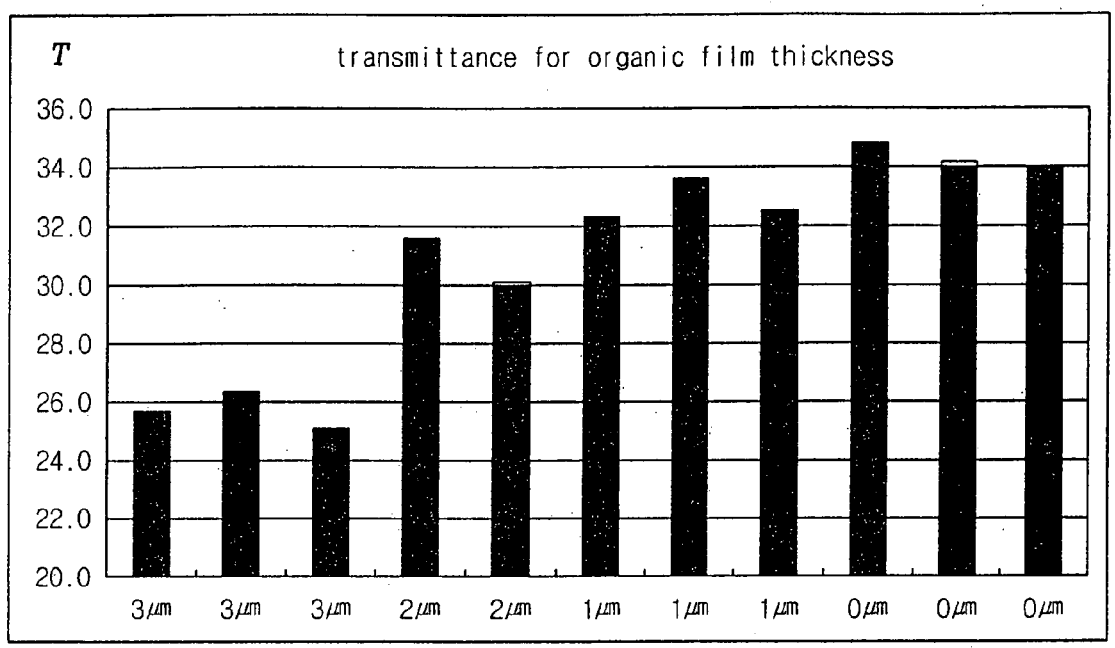
FIG. 28 is a graph illustrating the transmittance as function of the thickness of an organic insulating layer.

Although the organic insulating layer 50 provided on the pixel electrodes 190 widens the viewing angle, it decreases the transmittance, thereby reducing the brightness. As shown in FIG. 28, the lower the transmittance becomes as the thicker the organic insulating layer 50 becomes. The thickness of the organic insulating layer 50 is preferably equal to or less than 3.0 microns.

Now, various examples of organic insulating layer patterns in predetermined areas of pixel electrodes for increasing the brightness are described.

FIGS. 29A to 36 show several organic insulating layer patterns to be formed in predetermined areas of pixel electrodes.

Figure 29A:
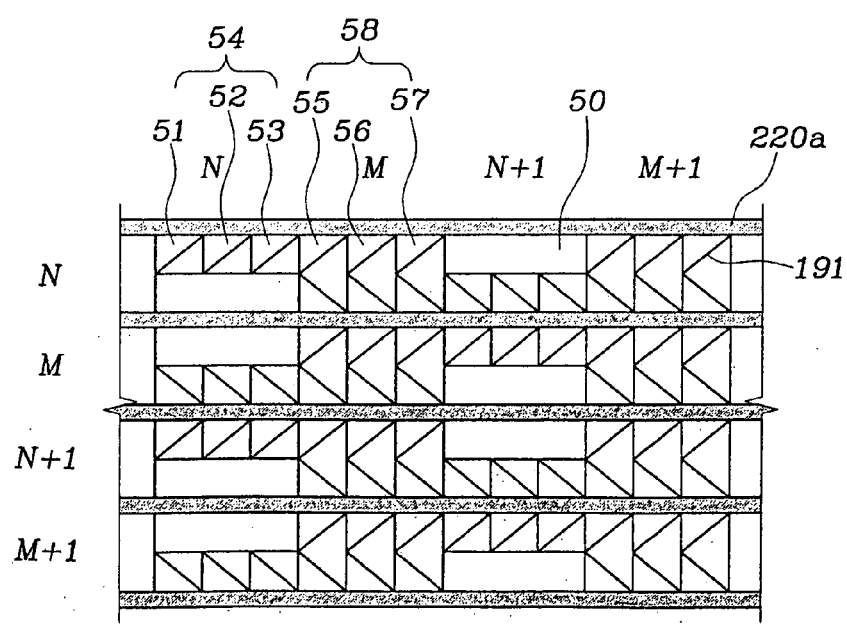
FIG. 29A shows a first exemplary pattern of an organic insulating layer according to the fifth embodiment of the present invention.
Figure 30:
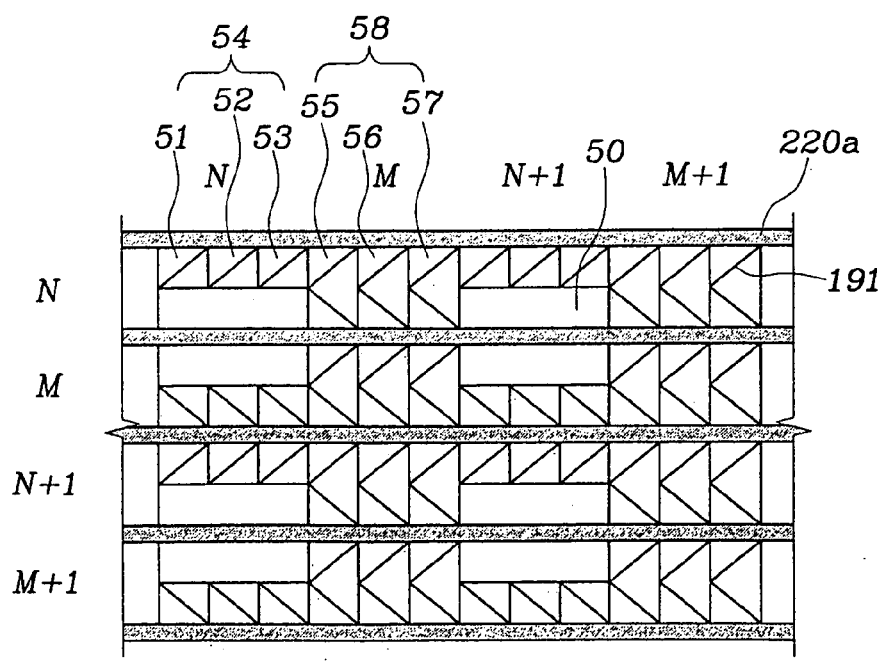
FIG. 30 shows a second exemplary pattern of an organic insulating layer according to the fifth embodiment of the present invention.

FIG. 29A illustrates a first exemplary pattern of an organic insulating layer according to the fifth embodiment of the present invention, and FIG. 30 illustrates a second exemplary pattern of an organic insulating layer according to the fifth embodiment of the present invention.

Referring to FIG. 29A, the pixel areas A of pixel electrodes 190 representing red, green and blue colors are defined as red (R) pixels 51 and 55, green (G) pixels 52 and 56, and blue (B) pixels 53 and 57, respectively. An area including a set of the R, G and B pixels 51, 52 and 53 provided with an organic insulating layer or an area including a set of the R, G and B pixels 55, 56 and 57 without the organic insulating layer is referred to as a dot 54 or 58. A dot 54 provided with the organic insulating layer in predetermined areas therein is referred to as an organic insulating dot, while a dot 55 without the organic insulating layer therein is referred to as a non organic insulating dot. The R pixel 51 of the organic insulating dot 54 is referred to as a R organic insulating pixel, the G pixel 52 of the organic insulating dot 54 is referred to as a G organic insulating pixel, and the B pixel 51 of the organic insulating dot 54 is referred to as a B organic insulating pixel.

Various organic insulating layer patterns on pixel electrodes 190 in relation to organic insulating dots 54 and non organic insulating dots 55 are illustrated in FIGS. 29A to 36. The organic insulating dot 54 and the non organic insulating dot 55 have equal areas for preventing the brightness reduction of some areas having an organic insulating layer 50.

50% of the area of each of the R, G and B organic insulating pixels 51, 52 and 53 is covered with an organic insulating layer 50.

Figure 29B:
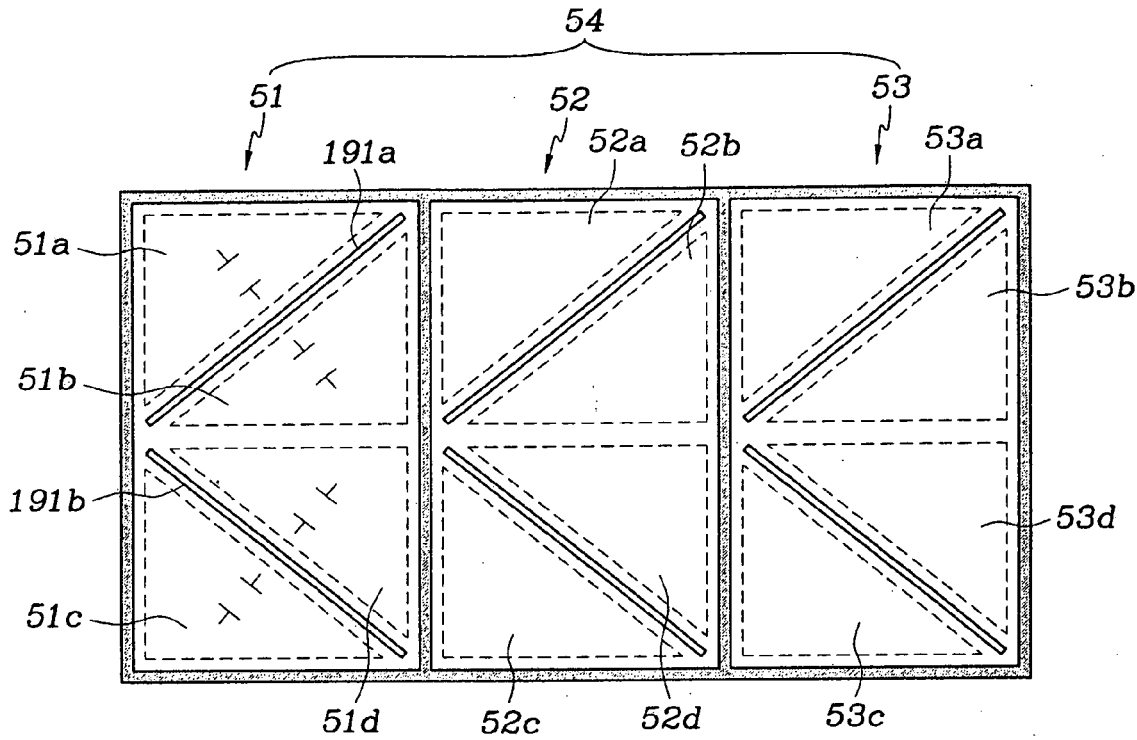
FIG. 29B is an enlarged view of a set of R, G and B organic insulating pixels 51, 52 and 53 shown in FIG. 29A.

FIG. 29B is an enlarged view of a set of R, G and B organic insulating pixels 51, 52 and 53 shown in FIG. 29A, which illustrates tilt directions of liquid crystal molecules.

As shown in FIG. 29B, the tilt directions of the liquid crystal molecules in each of the R, G and B organic insulating pixels 51, 52 and 53 are different.

For example, the R organic insulating pixel 51 is partitioned into first to fourth directional R organic domains 51a, 51b, 51c and 51d which are four regions having different tilt directions of the liquid crystal molecules 3. The R organic insulating pixel 51 has two pixel cutouts 191, an upper right cutout 191a having a right end located at an upper position and an upper left cutout 191b having a left end located at an upper position. The liquid crystal molecules in the first directional organic domain 51a tilt in a northwest direction due to the upper right cutout 191a, while those in the second directional organic domain 51b tilt in a southeast direction due to the upper right cutout 191a. Likewise, the liquid crystal molecules in the third directional organic domain 51c tilt in a northeast direction due to the upper left cutout 191b, while those in the fourth directional organic domain 51d tilt in a southwest direction due to the upper left cutout 191b.

Similarly, the G organic insulating pixel 52 is partitioned into first to fourth directional G organic domains 52a, 52b, 52c and 52d which are four regions having different tilt directions of the liquid crystal molecules 3, and the B organic insulating pixel 53 is partitioned into first to fourth directional B organic domains 53a, 53b, 53c and 53d which are four regions having different tilt directions of the liquid crystal molecules 3.

The organic insulating layer 50 is formed such that the occupied areas of the first to the fourth directional R organic domains 51a, 51b, 51c and 51d on the pixel electrode 190 are the same, and this is the same for the first to the fourth directional G organic domains 52a, 52b, 52c and 52d and the first to the fourth directional B organic domains 53a, 53b, 53c and 53d.

The organic insulating layer 50 is formed such that the first directional R organic domain 51a, the first directional G organic domain 52a and the first directional B organic domain 53a occupy the same area of the respective pixel electrodes 190, and this is the same for the second, the third and the fourth directional R, G and B organic domains.

Now, several organic insulating layer patterns satisfying these requirements are described.

FIGS. 29A to 32 show organic insulating layer patterns of line inversion type. The line-inversion-type organic insulating layer pattern means that organic insulating layer dots 54 and non organic insulating layer dots 55 are arranged alternately along a transverse direction or a longitudinal direction.

Referring to FIGS. 29A and 30, organic insulating layer dots 54 and non organic insulating layer dots 55 are alternately arranged along the transverse direction. Hereinafter, N indicates the first odd column or row, N+1 indicates the second odd column or row, M indicates the first even column or row, and M+1 indicates the second even column or row. The column N or N+1 includes organic insulating layer dots 54 while the column M or M+1 includes non organic insulating layer dots 55. Hereinafter, (N, M) means the row M of the column N.

In the first exemplary organic insulating layer pattern shown in FIG. 29A, first and second directional organic domains 51a, 51b, 52a, 52b, 53a and 53b of R, G and B organic insulating layer pixels of the organic insulating layer dots 54 at (N, M) and (N+1, N) are provided with an organic insulating layer 50. In addition, third and fourth directional organic domains 51c, 51d, 52c, 52d, 53c and 53d of the organic insulating layer dots 54 at (N, N) and (N+1, M) are provided with the organic insulating layer 50.

In the exemplary organic insulating layer pattern shown in FIG. 30, third and fourth directional organic domains 51c, 51d, 52c, 52d, 53c and 53d of the organic insulating layer dots 54 at (N, N) and (N+1, N) are provided with an organic insulating layer 50, while first and second directional organic domains 51a, 51b, 52a, 52b, 53a and 53b of the organic insulating layer dots 54 at (N, M) and (N+1, N) are provided with the organic insulating layer 50.

Figure 31:
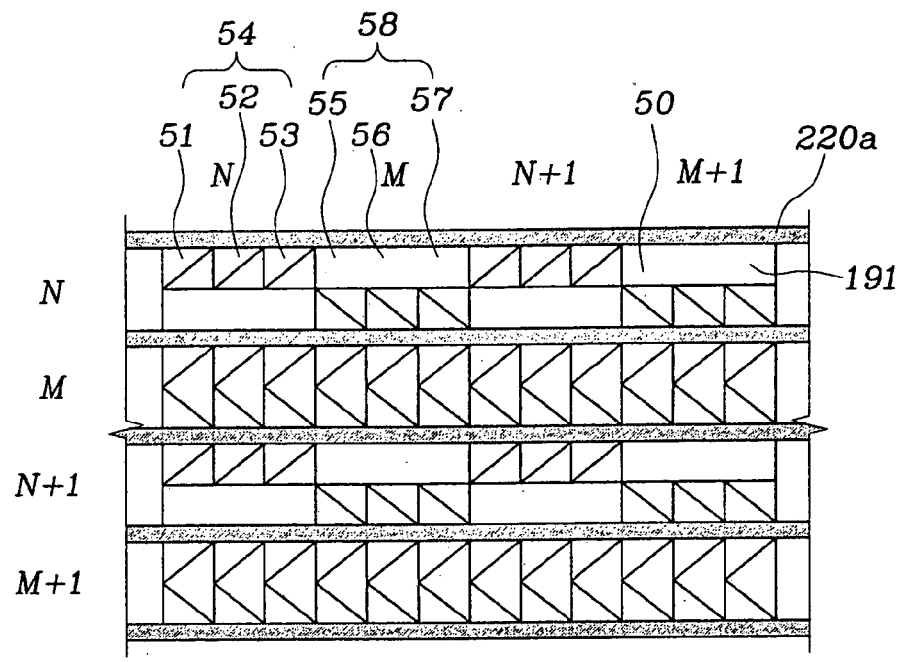
FIG. 31 shows a third exemplary pattern of an organic insulating layer according to the fifth embodiment of the present invention.
Figure 32:
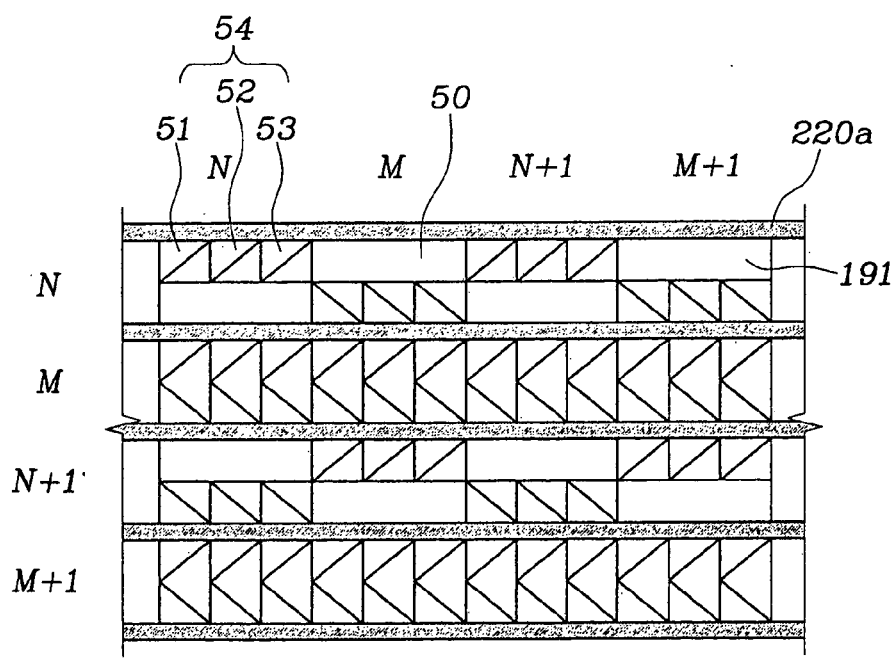
FIG. 32 shows a fourth exemplary pattern of an organic insulating layer according to the fifth embodiment of the present invention.

FIG. 31 illustrates a third exemplary pattern of an organic insulating layer according to the fifth embodiment of the present invention, and FIG. 32 illustrates a fourth exemplary pattern of an organic insulating layer according to the fifth embodiment of the present invention.

Referring to FIGS. 31 and 32, organic insulating layer dots 54 and non organic insulating layer dots 55 are alternately arranged along the longitudinal direction.

FIGS. 33 to 36 show organic insulating layer patterns of dot inversion type.

The dot-inversion-type organic insulating layer pattern means that a non organic insulating layer dot 55 is adjacent to organic insulating layer dots 54 in four directions. In other words, an organic insulating layer dot 54 is adjacent to non organic insulating layer dots 55 in four directions.

Figure 33:
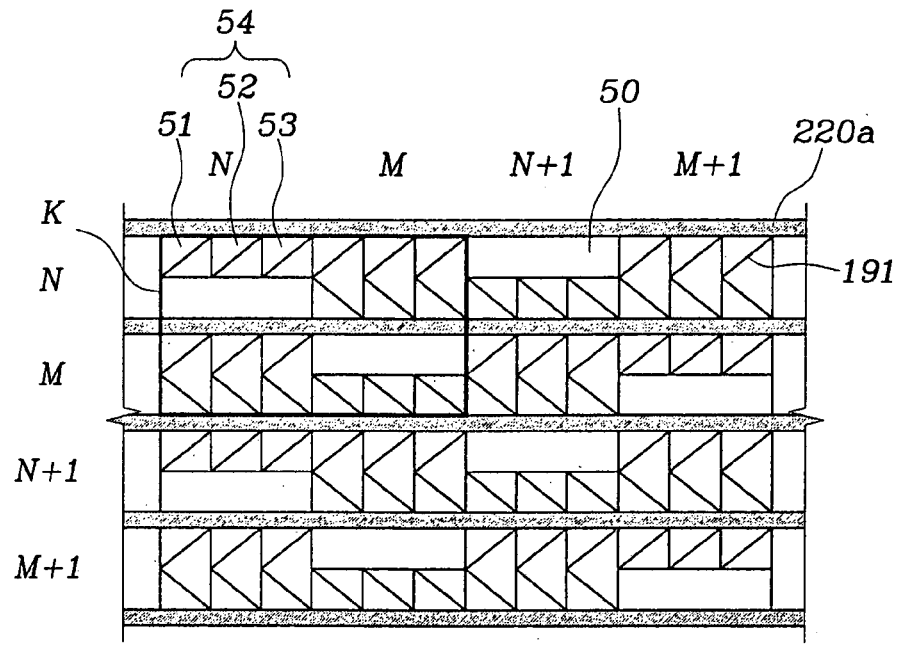
FIG. 33 shows a fifth exemplary pattern of an organic insulating layer according to the fifth embodiment of the present invention.
Figure 34:
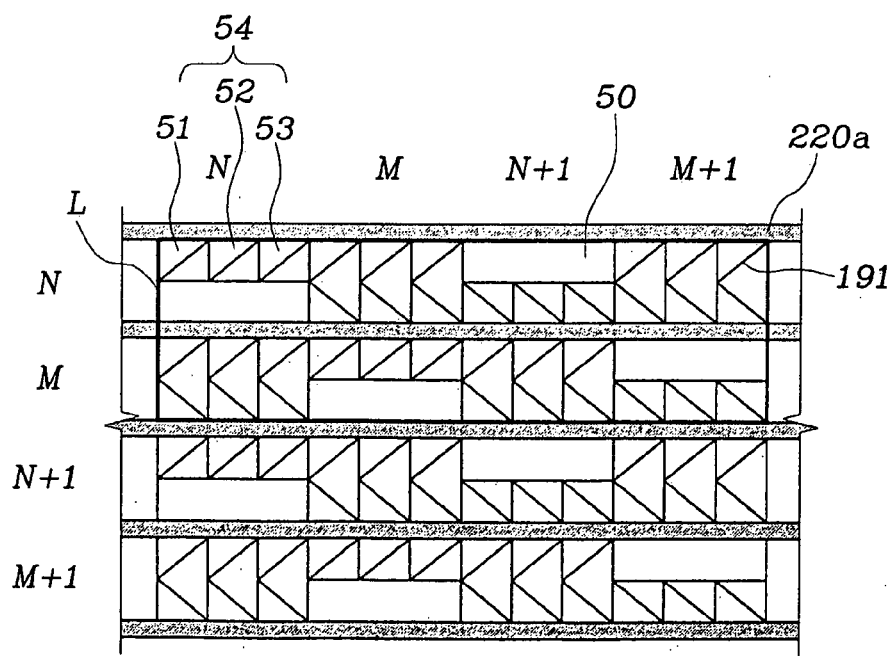
FIG. 34 shows a sixth exemplary pattern of an organic insulating layer according to the fifth embodiment of the present invention.

FIG. 33 illustrates a fifth exemplary pattern of an organic insulating layer according to the fifth embodiment of the present invention, and FIG. 34 illustrates a sixth exemplary pattern of an organic insulating layer according to the fifth embodiment of the present invention.

Referring to FIGS. 33 and 34, all dots adjacent to an organic insulating layer dot 54 in four directions are non organic insulating layer dots 55. The organic insulator 50 is provided at the same-directional organic domains among R, G and B organic domains 51a–51d, 52a–52d and 53a–53d.

In detail, as shown in FIG. 33, a non organic insulating layer dot 55 at (N+1, M) is adjacent to the organic insulating layer dots 54 in four directions. That is, organic insulating layer dots 54 are disposed at (N+1, N), (N+1, N+1); (M, M) and (M+1, M). All the first and the second directional organic domains 51a, 51b, 52a, 52b, 53a and 53b of R, G and B organic insulating layer pixels 51, 52 and 53 of the organic insulating layer dot 54 at (N+1, N) are provided with the organic insulator 50. In the fifth exemplary organic insulating pattern shown in FIG. 33, the organic insulator 50 is formed such that the numbers of the first to fourth directional organic domains provided with the organic insulator 50, which are contained in four dots forming a square, are the same. That is, in a square K including four dots at (N, N), (M, N), (N, M) and (M, M), the third and fourth directional R, G and B organic domains 51c, 51d, 52c, 52d, 53c and 53d of the organic insulating layer dot 54 at (N, N) are provided with the organic insulator 50, and the first and second directional R, G and B organic domains 51a, 51b, 52a, 52b, 53a and 53b of the organic insulating layer dot 54 at (M, M) are provided with the organic insulator 50. Accordingly, the numbers of the first to the fourth directional organic domains provided with the organic insulator 50, which are contained in four dots, are the same.

In the sixth exemplary organic insulating pattern shown in FIG. 34, the organic insulator 50 is formed such that the numbers of the first to fourth directional organic domains provided with the organic insulator 50, which are contained in eight dots forming a rectangle, are the same. That is, in a rectangle including eight dots at (N, N), (M, N), (N, M), (M, M), (N+1, N), (M+1, N), (N+1, M) and (M+1, M), the third and fourth directional R, G and B organic domains 51c, 51d, 52c, 52d, 53c and 53d of the organic insulating layer dots 54 at (N, N) and (M, M) are provided with the organic insulator 50, and the first and second directional R, G and B organic domains 51a, 51b, 52a, 52b, 53a and 53b of the organic insulating layer dots 54 at (N+1, N) and (M+1, M) are provided with the organic insulator 50. Accordingly, the numbers of the first to the fourth directional organic domains provided with the organic insulator 50, which are contained in eight dots, are the same.

Figure 35:
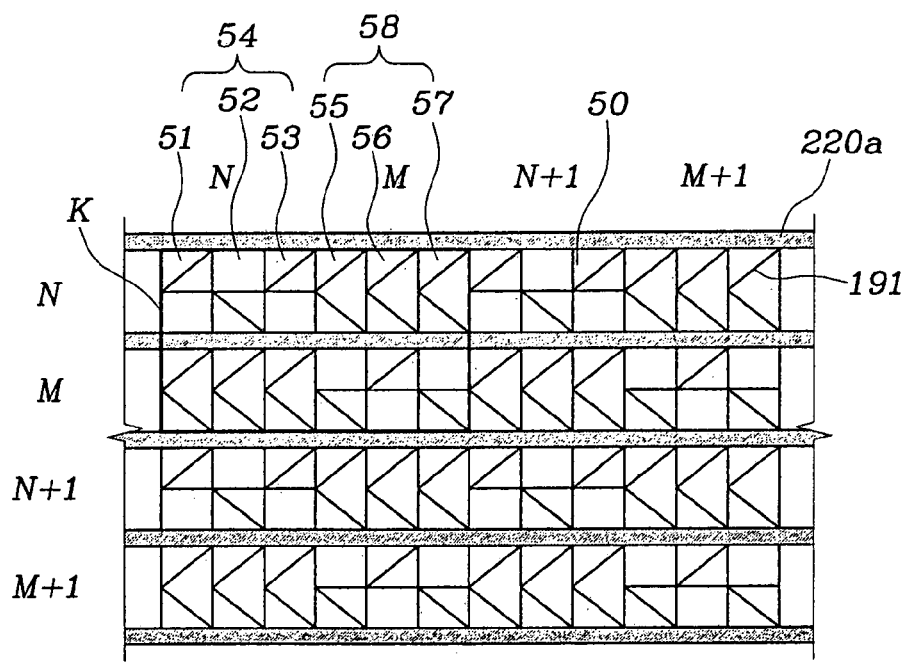
FIG. 35 shows a seventh exemplary pattern of an organic insulating layer according to the fifth embodiment of the present invention.
Figure 36:
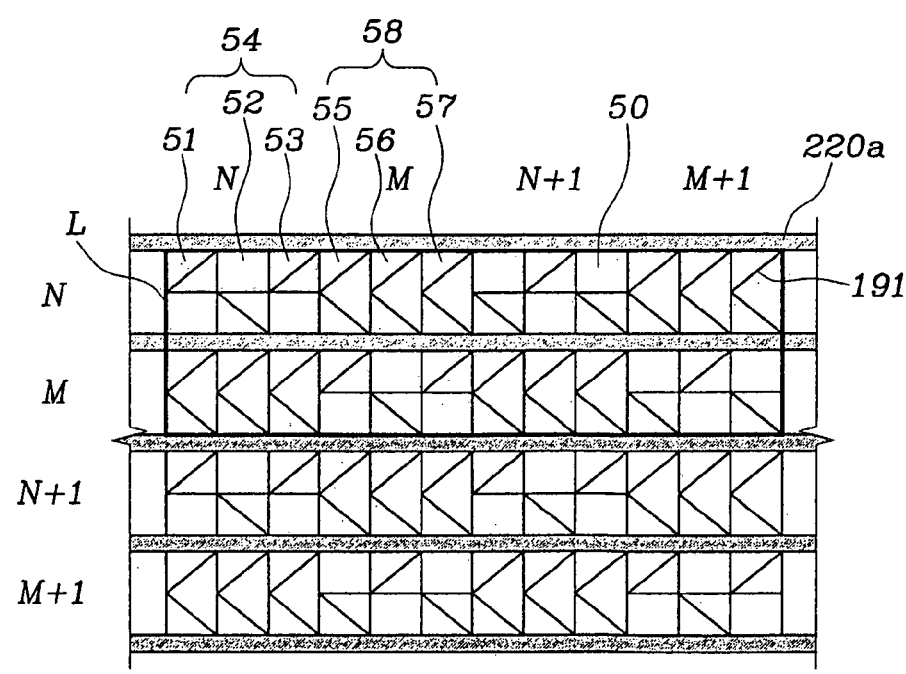
FIG. 36 shows an eighth exemplary pattern of an organic insulating layer according to the fifth embodiment of the present invention.

FIG. 35 illustrates a seventh exemplary pattern of an organic insulating layer according to the fifth embodiment of the present invention, and FIG. 36 illustrates a eighth exemplary pattern of an organic insulating layer according to the fifth embodiment of the present invention.

Referring to FIGS. 35 and 36, all dots adjacent to an organic insulating layer dot 54 in four directions are non organic insulating layer dots 55. In an organic insulating layer dot 54, the organic insulator 50 is provided at two of four first to fourth directional organic domains of R and B organic insulating layer pixels 51 and 53 and at the other two of the four first to fourth directional organic domains of a G organic insulating layer pixel 52.

In detail, in the seventh exemplary organic insulating pattern shown in FIG. 35, the organic insulator 50 is formed such that the numbers of the first to fourth directional organic domains provided with the organic insulator 50, which are contained in four dots forming a square, are the same. That is, in a square K including four dots at (N, N), (M, N), (N, M) and (M, M), the third and fourth directional R and B organic domains 51c, 51d, 53c and 53d and the first and second directional G organic domains 52a and 52b of the organic insulating layer dot 54 at (N, N) are provided with the organic insulator 50. In addition, the organic insulator 50 is also provided at the first and second directional R and B organic domains 51a, 51b, 53a and 53b and the third and fourth directional G organic domains 52c and 52d of the organic insulating layer dot 54 at (M, M) are provided with the organic insulator 50. Accordingly, the numbers of the first to, the fourth directional organic domains provided with the organic insulator 50, which are contained in four dots, are the same.

In the eight organic insulating pattern shown in FIG. 36, the organic insulator 50 is formed such that the numbers of the first to fourth directional organic domains provided with the organic insulator 50, which are contained in eight dots forming a rectangle, are the same. That is, in a rectangle including eight dots at (N, N), (M, N), (N, M), (M, M), (N+1, N), (M+1, N), (N+1, M) and (M+1, M), the third and fourth directional R and B organic domains 51c, 51d, 53c and 53d and the first and second directional G organic domains 52a and 52b of the organic insulating layer dots 54 at (N, N) and (M, M) are provided with the organic insulator 50, and the first and second directional R and B organic domains 51a, 51b, 53a and 53b and the third and fourth directional G organic domains 52c and 52d of the organic insulating layer dots 54 at (N+1, N) and (M+1, M) are provided with the organic insulator 50. Accordingly, the numbers of the first to the fourth directional organic domains provided with the organic insulator 50, which are contained in eight dots, are the same.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims. Especially, a variety of modifications may be made in arrangements of cutouts provided at the pixel electrodes and the common electrode.

The above-described configurations improve the lateral visibility of an LCD and widen the viewing angle.

According to the present invention, an organic insulator provided on a predetermined area in a pixel area reduces the field strength therein, and thus a plurality of regions with different transmittance for a given voltage are generated. Accordingly, the lateral visibility of an LCD is improved.

In addition, the organic insulator is provided in line inversion type or dot inversion type such that the area of a pixel electrode occupied by the organic insulator is minimized, thereby preventing the reduction of brightness due to the organic insulator.

What is claimed is:

1. A thin film transistor array panel comprising:
   an insulating substrate;
   a gate line formed on the insulating substrate;
   a data line intersecting the gate line and insulated from the gate line;
   a pixel electrode provided in a pixel area defined by the intersection of the gate line and the data line and including at least two portions having different heights in the pixel area; and
   a thin film transistor provided in a pixel area defined by the intersection of the gate line and the data line and connected to the gate line, the data line and the pixel electrode,
   wherein the pixel electrode comprises a plurality of cutouts, wherein at least one of the cutouts is disposed on an area that does not include a gate insulating layer and a passivation layer and at least another one of the cutouts is disposed on the passivation layer.

2. The thin film transistor array panel of claim 1, further comprising:
   the gate insulating layer insulating the gate line from the data line; and
   the passivation layer insulating the data line from the pixel electrode,
   wherein the number of the at least two portions of the pixel electrode having different heights is two, and one of the two portions of the pixel electrode is located on the passivation layer or the gate insulating layer while the other of the two portions of the pixel electrode is located on an area without the gate insulating layer and the passivation layer.

3. The thin film transistor array panel of claim 1, wherein the data line comprises three layers of an amorphous silicon layer, a doped amorphous silicon layer and a metal layer.

4. A liquid crystal display comprising:
   a first insulating substrate;
   a gate line formed on the first insulating substrate;
   a data line intersecting the gate line and insulated from the gate line;

a pixel electrode provided in a pixel area defined by the intersection of the gate line and the data line;

a second insulating substrate facing the first insulating substrate;

a common electrode formed on the second insulating substrate;

a liquid crystal layer interposed between the pixel electrode and the common electrode;

a first domain partitioning member provided on one of the first and the second insulating substrates; and a second domain partitioning member provided on one of the first and the second insulating substrates and partitioning the pixel area into a plurality of domains along with the first domain partitioning member, wherein the plurality of domains in the pixel area are classified into at least two types based on thickness of the liquid crystal layer.

5. The liquid crystal display of claim 4, wherein the first domain partitioning member includes a cutout of the pixel electrode and the second domain partitioning member includes a cutout of the common electrode.

6. The liquid crystal display of claim 4, wherein the plurality of domains in the pixel area are classified into four groups based on tilt directions of liquid crystal molecules in the liquid crystal layer upon voltage application.

7. The liquid crystal display of claim 6, wherein each of the four groups based on tilt directions of liquid crystal molecules in the liquid crystal layer upon voltage application includes domains of all of the at least two types classified based on thickness of the liquid crystal layer.

8. The liquid crystal display of claim 4, further comprising:

a gate insulating layer insulating the gate line from the data line; and a passivation layer insulating the data line from the pixel electrode, wherein the number of the at least two types based on thickness of the liquid crystal layer is two, and the pixel electrode is located on an area with the passivation layer or the gate insulating layer and on another area without the gate insulating layer and the passivation layer.

9. The liquid crystal display of claim 4, wherein the data line comprises three layers of an amorphous silicon layer, a doped amorphous silicon layer and a metal layer.

* * * * *